US011521372B2

(12) United States Patent
Tanniru et al.

(10) Patent No.: US 11,521,372 B2
(45) Date of Patent: Dec. 6, 2022

(54) UTILIZING MACHINE LEARNING MODELS, POSITION BASED EXTRACTION, AND AUTOMATED DATA LABELING TO PROCESS IMAGE-BASED DOCUMENTS

(71) Applicant: Accenture Global Solutions Limited, Dublin (IE)

(72) Inventors: Rajendra Prasad Tanniru, Basking Ridge, NJ (US); Aditi Kulkarni, Bengaluru (IN); Koushik M. Vijayaraghavan, Chennai (IN); Luke Higgins, West Pymble (AU); Xiwen Sun, McKinnon (AU); Riley Green, Hurlstone Park (AU); Man Lok Ching, Mascot (AU); Jiayi Chen, Melbourne (AU); Xiaolei Liu, Preston (AU); Isabella Phoebe Groenewegen Moore, Sydney (AU); Reuben Lema, Sydney (AU)

(73) Assignee: Accenture Global Solutions Limited, Dublin (IE)

( * ) Notice: Subject to any disclaimer, the term of this patent is extended or adjusted under 35 U.S.C. 154(b) by 320 days.

(21) Appl. No.: 16/825,313

(22) Filed: Mar. 20, 2020

(65) Prior Publication Data
US 2021/0295103 A1 Sep. 23, 2021

(51) Int. Cl.
*G06V 10/774* (2022.01)
*G06K 9/62* (2022.01)
(Continued)

(52) U.S. Cl.
CPC ....... *G06V 10/7747* (2022.01); *G06K 9/6257* (2013.01); *G06K 9/6268* (2013.01);
(Continued)

(58) Field of Classification Search
CPC ...... G06V 30/10; G06V 30/36; G06V 30/414; G06V 10/225; G06V 10/7747;
(Continued)

(56) References Cited

U.S. PATENT DOCUMENTS

2019/0311227 A1 10/2019 Kriegman et al.
2021/0150338 A1* 5/2021 Semenov ............... G06V 10/82

OTHER PUBLICATIONS

Anonymous., "Anchor Base," Jan. 30, 2018, XP055799236, pp. 1-2. Retrieved from the Internet: [https://docs.uipath.com/activities/docs/anchor-base].

(Continued)

*Primary Examiner* — Daniel G Mariam
(74) *Attorney, Agent, or Firm* — Harrity & Harrity, LLP

(57) ABSTRACT

A device may receive image data that includes an image of a document and lexicon data identifying a lexicon, and may perform an extraction technique on the image data to identify at least one field in the document. The device may utilize form segmentation to automatically generate label data identifying labels for the image data, and may process the image data, the label data, and data identifying the at least one field, with a first model, to identify visual features. The device may process the image data and the visual features, with a second model, to identify sequences of characters, and may process the image data and the sequences of characters, with a third model, to identify strings of characters. The device may compare the lexicon data and the strings of characters to generate verified strings of characters that may be utilized to generate a digitized document.

20 Claims, 18 Drawing Sheets

(51) Int. Cl.
*G06N 3/04* (2006.01)
*G06N 3/08* (2006.01)
*G06V 10/22* (2022.01)
*G06V 30/32* (2022.01)
*G06V 30/414* (2022.01)
*G06V 30/10* (2022.01)

(52) U.S. Cl.
CPC .............. *G06N 3/04* (2013.01); *G06N 3/0445* (2013.01); *G06N 3/0454* (2013.01); *G06N 3/08* (2013.01); *G06V 10/225* (2022.01); *G06V 30/36* (2022.01); *G06V 30/414* (2022.01); *G06V 30/10* (2022.01)

(58) Field of Classification Search
CPC .......... G06V 10/764; G06N 3/04; G06N 3/08; G06N 3/0445; G06N 3/0454; G06K 9/6268
See application file for complete search history.

(56) References Cited

OTHER PUBLICATIONS

Diesendruck L., et al., "A Framework to Access Handwritten information Within Large Digitized Paper Collections," 2012 IEEE 8th International Conference on E-Science, Chicago, IL, USA, Oct. 2012, pp. 1-10.
Extended European Search Report for Application No. EP20207951.3, dated May 11, 2021, 15 pages.
Google Search: "Position Based Extractor Anchoring," Apr. 28, 2021, pp. 1-2, XP055799237, [retrieved on Apr. 28, 2021], Retrieved from the Internet: [URL:https://www.google.com/search?q=position+based+extractor +anchoring&hi=en&source=Int&tbs=cdr%3A1%2Ccd_min%3A%2Ccd_max%3A03-20-2020].
Shields C., "Text-based Document Similarity Matching Using sdtext," IEEE, 2016 49th Hawaii International Conference on System Sciences (HICSS), XP032879571, Jan. 5, 2016, pp. 5607-5616.

* cited by examiner

UTILIZING MACHINE LEARNING MODELS, POSITION BASED EXTRACTION, AND AUTOMATED DATA LABELING TO PROCESS IMAGE-BASED DOCUMENTS

BACKGROUND

Document processing includes converting typed and handwritten text on paper-based and electronic documents (e.g., scanned image of a document) into electronic information using intelligent character recognition (ICR), optical character recognition (OCR), manual data entry, and/or the like.

SUMMARY

According to some implementations, a method may include receiving image data that includes an image of a document to be digitized and lexicon data identifying a lexicon associated with the document, and performing an extraction technique on the image data to identify at least one field provided in the document. The method may include utilizing form segmentation to automatically generate label data identifying labels for the image data, and processing the image data, the label data, and data identifying the at least one field, with a convolutional neural network model, to identify visual features of the image data. The method may include processing the image data and the visual features, with a recurrent neural network model, to identify sequences of characters in the image data, and processing the image data and the sequences of characters, with a connectionist temporal classification model, to identify strings of characters in the image data. The method may include comparing the lexicon data and the strings of characters to verify the strings of characters and to generate verified strings of characters and confidence scores for the verified strings of characters, and utilizing the verified strings of characters and the confidence scores to generate a digitized document that includes a digital form of the document. The method may include performing one or more actions based on the digitized document.

According to some implementations, a device may include one or more memories, and one or more processors to receive image data that includes images of documents to be digitized and lexicon data identifying a lexicon associated with the documents, and perform an extraction technique on the image data to identify a set of fields provided in the documents. The one or more processors may utilize form segmentation to automatically generate label data identifying labels for the image data, and may process the image data, the label data, and data identifying the set of fields, with a convolutional neural network model, to identify visual features of the image data. The one or more processors may process the image data and the visual features, with a recurrent neural network model, to identify sequences of characters in the image data, and may process the image data and the sequences of characters, with a connectionist temporal classification model, to identify strings of characters in the image data. The one or more processors may compare the lexicon data and the strings of characters to verify the strings of characters and to generate verified strings of characters and confidence scores for the verified strings of characters, and may utilize the verified strings of characters and the confidence scores to generate digitized documents that include digital forms of the documents. The one or more processors may perform one or more actions based on the digitized documents.

According to some implementations, a non-transitory computer-readable medium may store one or more instructions that, when executed by one or more processors of a device, may cause the one or more processors to receive image data that includes an image of a document to be digitized and lexicon data identifying a lexicon associated with the document, and perform an extraction technique on the image data to identify at least one field provided in the document. The one or more instructions may cause the one or more processors to utilize form segmentation or crowdsourcing to automatically generate label data identifying labels for the image data, and process the image data, the label data, and data identifying the at least one field, with a convolutional neural network model, to identify visual features of the image data. The one or more instructions may cause the one or more processors to process the image data and the visual features, with a recurrent neural network model, to identify sequences of characters in the image data, and process the image data and the sequences of characters, with a connectionist temporal classification model, to identify strings of characters in the image data, wherein the convolutional neural network model, the recurrent neural network model, and the connectionist temporal classification model are trained based on one or more of a data set that includes handwritten words, handwritten digits, and alphanumeric characters, a data set that includes individual characters, or a data set that includes extracted data that is labeled via crowdsourcing. The one or more instructions may cause the one or more processors to compare the lexicon data and the strings of characters to verify the strings of characters and to generate verified strings of characters and confidence scores for the verified strings of characters, and utilize the verified strings of characters and the confidence scores to generate a digitized document that includes a digital form of the document. The one or more instructions may cause the one or more processors to perform one or more actions based on the digitized document.

DETAILED DESCRIPTION

Figure 1A:
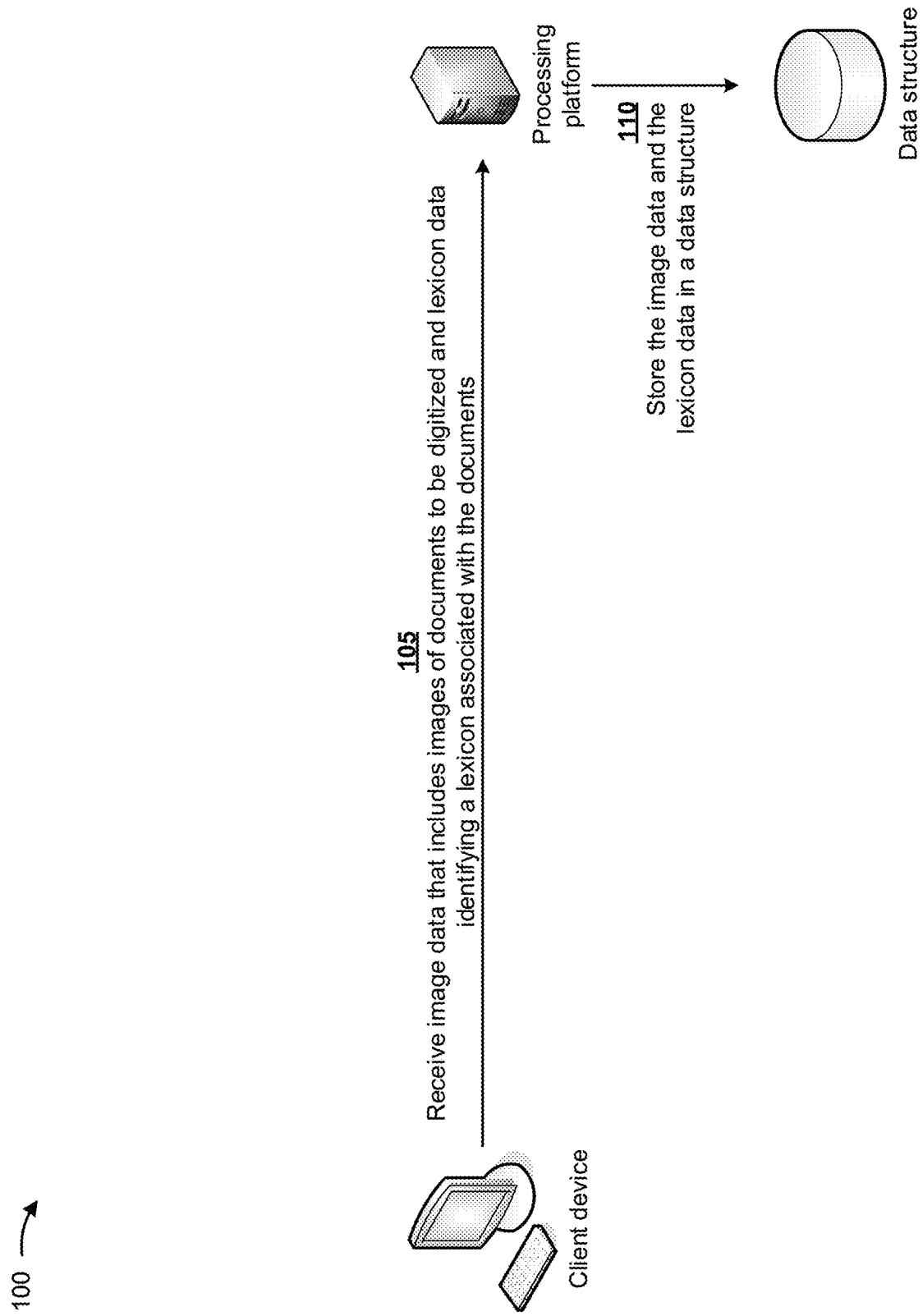
FIGS. 1A-1K are diagrams of one or more example implementations described herein.

The following detailed description of example implementations refers to the accompanying drawings. The same reference numbers in different drawings may identify the same or similar elements.

Current document processing techniques typically require manually copying or scanning documents into an image format, sorting the imaged documents, and converting the imaged documents into a digital format. Such document processing techniques are expensive, time consuming, may results in poor customer service (e.g., based on overdue processing, inaccuracies, and/or the like), and/or the like. Thus, current document processing techniques may waste computing resources (e.g., processing resources, memory resources, communication resources, and/or the like), networking resources, human resources, and/or the like associated with manually processing documents, generating incorrect digital forms of the documents, correcting the incorrect digital forms of the documents if discovered, and/or like.

Some implementations described herein provide a processing platform that utilizes machine learning models, position based extraction, and automated data labeling to process image-based documents. For example, the processing platform may receive image data that includes an image of a document to be digitized and lexicon data identifying a lexicon associated with the document, and may perform an extraction technique on the image data to identify at least one field provided in the document. The processing platform may utilize form segmentation to automatically generate label data identifying labels for the image data, and may process the image data, the label data, and data identifying the at least one field, with a convolutional neural network model, to identify visual features of the image data. The processing platform may process the image data and the visual features, with a recurrent neural network model, to identify sequences of characters in the image data, and may process the image data and the sequences of characters, with a connectionist temporal classification model, to identify strings of characters in the image data. The processing platform may compare the lexicon data and the strings of characters to verify the strings of characters and to generate verified strings of characters and confidence scores for the verified strings of characters, and may utilize the verified strings of characters and the confidence scores to generate a digitized document that includes a digital form of the document. The processing platform may perform one or more actions based on the digitized document.

In this way, the processing platform utilizes machine learning models, position based extraction, and automated data labeling to process image-based documents. The processing platform may provide an intelligent automation framework that categorizes, manages, and reads documents (e.g., handwritten and printed text documents), such as medical documents, forms, invoices, and/or the like. The processing platform creates a pipeline where a user can read and understand complex information contained in new documents within a short time period (e.g., minutes). The processing platform also enables a user to perform document processing (e.g., document information extraction) without involvement of additional users. This, in turn, conserves computing resources, networking resources, and/or the like that would otherwise be wasted in manually processing documents, generating incorrect digital forms of the documents, correcting the incorrect digital forms of the documents if discovered, and/or like.

FIGS. 1A-1K are diagrams of one or more example implementations 100 described herein. As shown in FIG. 1A, a client device may be associated with a processing platform. The client device may include a mobile device, a computer, and/or the like. The processing platform may include a platform that utilizes machine learning models, position based extraction, and automated data labeling to process image-based documents, as described herein.

As further shown in FIG. 1A, and by reference number 105, the processing platform may receive image data that includes images of documents to be digitized and lexicon data identifying lexicons associated with the documents. The documents may include printed text, handwritten text, graphical elements (e.g., shapes, icons, charts, graphs, and/or the like), photographs, and/or the like. The documents may be forms (e.g., business forms, application forms, mailing forms, receipts, and/or the like) and may be associated with an enterprise, an industry, and/or the like. For example, the documents may include medical documents, shipping documents, financial documents, and/or the like associated with healthcare providers, accounting firms, a package delivery company, and/or the like. The image data may be generated by scanning the documents, photographing the documents, capturing images of the documents by other appropriate means, and/or the like. In some implementations, the lexicon data may include data identifying lexicons (e.g., vocabularies of words or phrases) associated with particular languages, fields, industries, enterprises, documents and/or the like.

As further shown in FIG. 1A, and by reference number 110, the processing platform may store the image data and the lexicon data in a data structure (e.g., a database, a table, a list, and/or the like) associated with the processing platform. In some implementations, there may be hundreds, thousands, and/or the like, of client devices that produce thousands, millions, billions, and/or the like, of data points provided in the image data and the lexicon data. In this way, the processing platform may handle thousands, millions, billions, and/or the like, of data points within a period of time (e. g., daily, weekly, monthly), and thus may provide "big data" capability.

Before further processing the image data and the lexicon data, the processing platform may employ optical character recognition, natural language processing, and/or the like on the image data and the lexicon data. Optical character recognition (OCR) is the electronic or mechanical conversion of images of typed, handwritten or printed text into machine-encoded text, OCR may produce a ranked list of candidate characters via matrix matching and/or feature extraction. Matrix matching (also known as pattern matching, pattern recognition, image correlation, and/or the like) involves comparing an image to a stored glyph on a pixel-by-pixel basis. Matrix matching relies on the input glyph being correctly isolated from the rest of the image, and on the stored glyph being in a similar font and at the same scale. Feature extraction decomposes glyphs into "features" like lines, closed loops, line direction, and line intersections. The features are compared with an abstract vector-like representation of a character, which may reduce to one or more glyph prototypes. Nearest neighbor classifiers (e.g., the k-nearest neighbors algorithm) may be used to compare image features with stored glyph features and choose the nearest match.

The processing platform may perform natural language processing on the image data and the lexicon data to generate textual data that may be used to identify fields of interest in the documents. When performing the natural language processing, the processing platform may employ natural language understanding (NLU) to understand a human natural language representation that can be processed by a computer and/or to generate a description from a structured data set in natural language tailored to specific rule sets. The processing platform may use NLU to recognize text in a document and to identify fields of interest associated with the text. The processing platform may remove stop words from the textual data, may pre-process the textual data, may apply lemmatization to the textual data, may create a set of resultant keywords for each sentence in the textual data, may remove punctuations from the textual data, may tokenize words in the textual data to enable analysis of the words, may remove sentences with less than a predetermined quantity of words from the textual data, may determine most frequent keywords utilized in textual data, and/or the like. When performing the natural language processing on the textual data, the processing platform may convert the textual data into machine-readable text, may split the machine-readable text into an array of words, may split the array of words into sequences of contiguous words, may calculate word scores for the sequences of contiguous words, and/or the like.

Figure 1B:
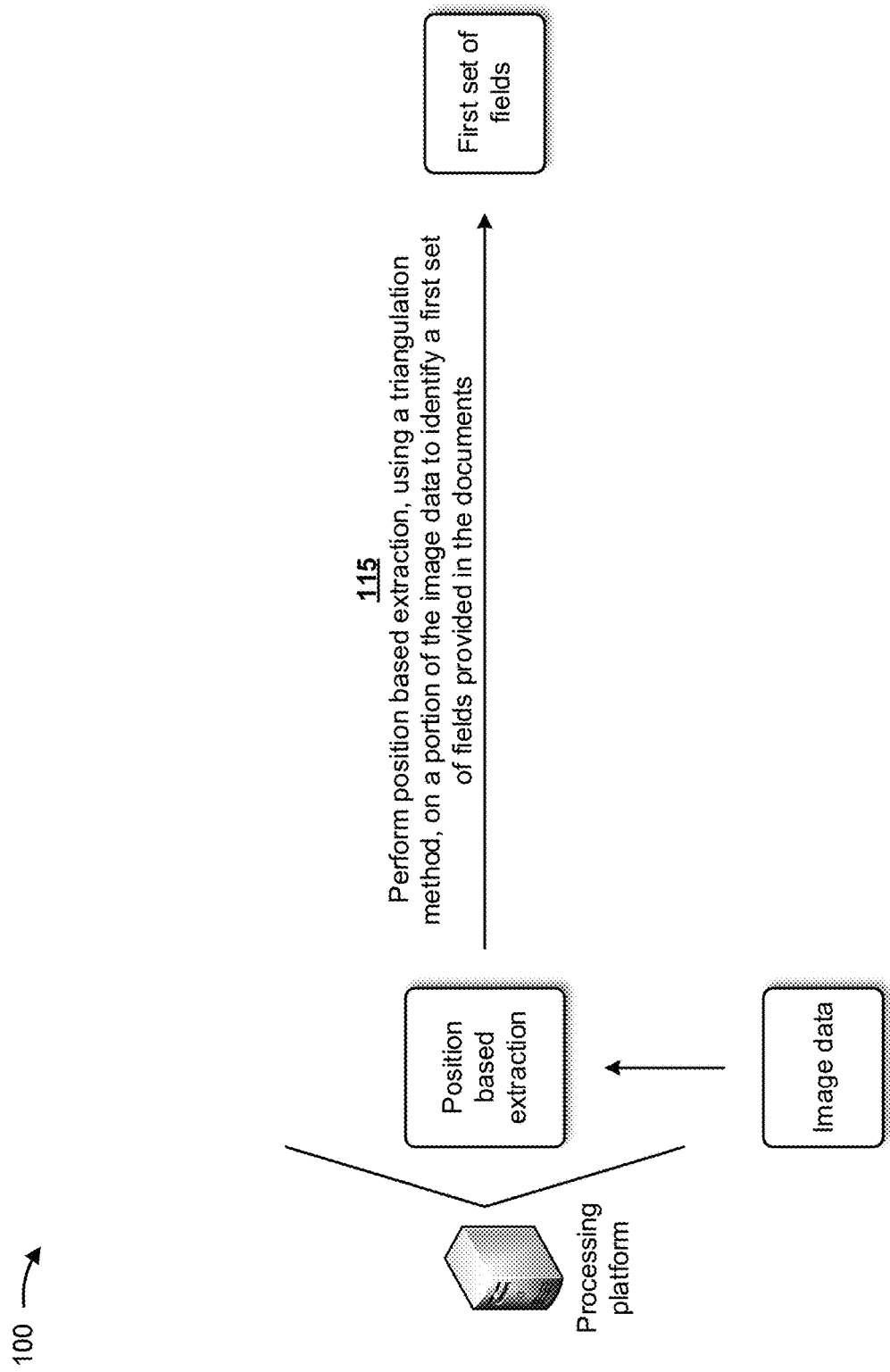

As shown in FIG. 1B, and by reference number 115, the processing platform may perform position based extraction, using a triangulation method, on a portion of the image data to identify a first set of fields provided in the documents. In some implementations, performing the position based extraction includes defining pixel locations of fields of interest in the documents. Because identifying the pixel locations of a given field in multiple documents is challenging (e.g., due to variation in image resolution and quality, document displacement and/or rotation during scanning of the documents), the processing platform may employ a triangulation method in which the processing platform may identify particular text in the image of the document, designate the particular text as anchors for the image of the document, and triangulate the anchors to the image data to identify the at least one field of the first set of fields provided in the document.

In some implementations, the processing platform may provide a user interface for a user to configure and utilize position based extraction with the triangulation method, such as for a particular type of document, for a particular purpose, and/or the like. A user may select three features (e.g., three fields of a form) that are expected to always or typically be in the same location of the document. The processing platform may use the location of these selected features as anchors of the document. For example, the processing platform may determine the locations of subsequently configured fields relative to the anchors, and may save the locations of the subsequently configured fields. Additionally, the processing platform may use the anchors to determine the orientation and rotation of subsequently scanned forms if the image quality varies from the configured sample, and may dilate the relative distance. By establishing anchors on a form when creating a document configuration, the processing platform may map the location of attributes based on relative distance of the location of the attributes to the anchors. In this way, the processing platform may recognize and process different forms based on the anchors.

Figure 1C:
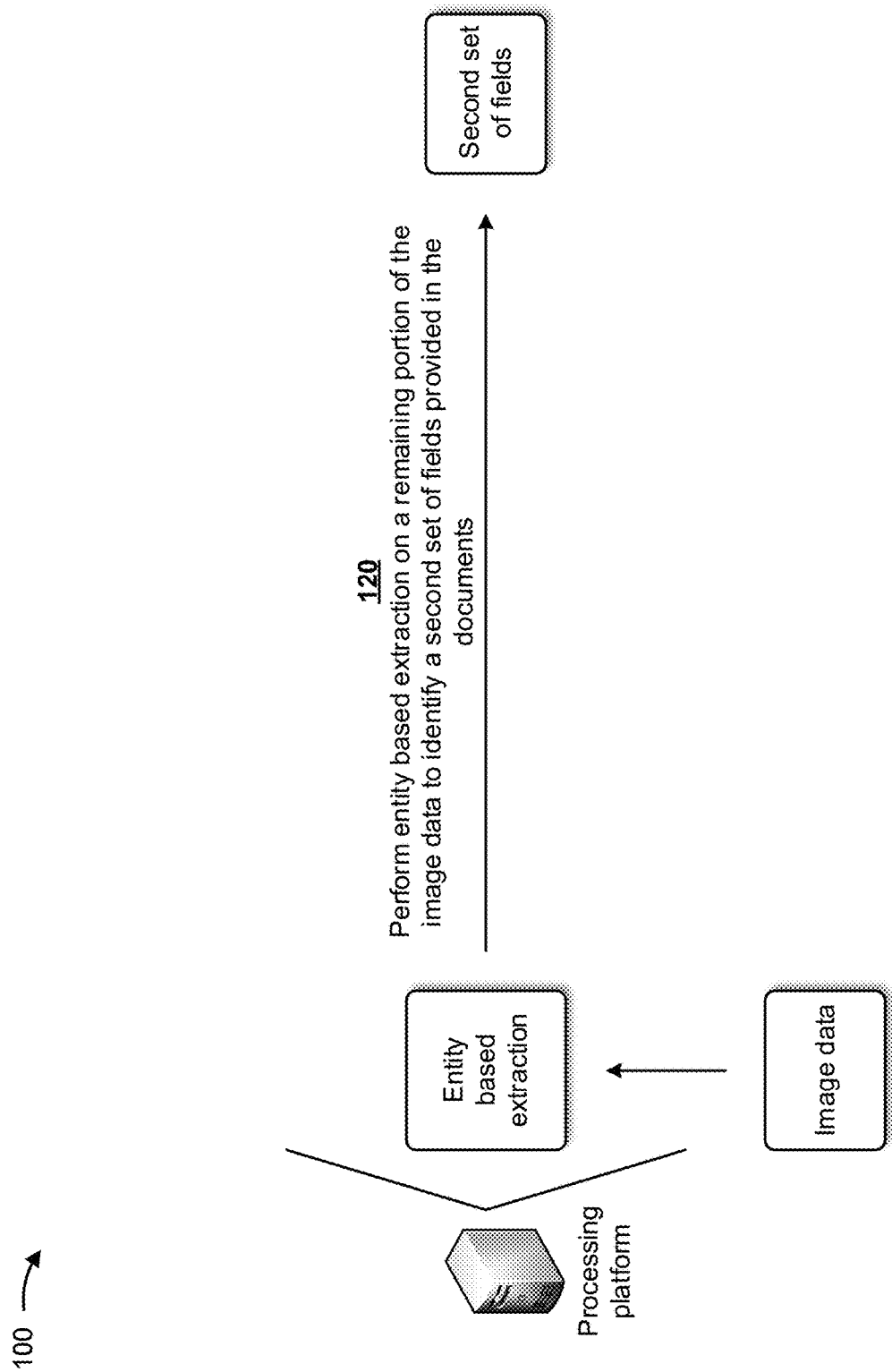

As shown in FIG. 1C, and by reference number 120, the processing platform may perform entity based extraction on a remaining portion of the image data to identify a second set of fields provided in the documents. In some implementations, the processing platform may use entity extraction to extract fields that are similar in style (e.g., date fields) or denoted by a key (e.g. "Tax Invoice"). Once an entity is identified, the processing platform may search the document for the entity to find a most likely data match. For example, the processing platform may determine that an entity (e.g., a string beginning with "INV" and followed by a number), that is positioned to the right of "Tax Invoice No," is a most likely match for the entity (e.g., an invoice number). In the case of key based extraction, the processing platform may search a document or a page for all keys, and may assign a value to each key identified based on a positioning of text around the key. In some implementations, the processing platform may provide a user interface for a user to configure and utilize entity based extraction, such as for a particular type of document, for a particular purpose, and/or the like. The entity based extraction function may include pre-trained entities (e.g., dates, dollar amounts, organizational names, pronouns, locations, and/or the like) and may be customized by the user and trained to find other entities (e.g., animals, foods, specific company products, and/or the like).

The processing platform may perform position based extraction, may perform entity based extraction, or may perform both position based extraction and entity based extraction, to identify fields of interest provided in the documents for information extraction. The processing platform may provide a user of the processing platform with an option to utilize either one or both such forms of extraction depending on the nature and characteristics of the documents, the objectives of identifying, interpreting and managing the information associated with the documents, and/or the like. For example, a user may choose to utilize position based extraction when the user is unsure of the quality of the inputted data, when the documents are likely to have bounds and a common layout where the data can be inputted (e.g. medical forms, bank loan applications, and/or the like), and/or when the data may change between printed and handwritten text. Additionally, or alternatively, the user may choose to utilize entity based extraction when the data is associated with common attributes, and/or when the data is a free-flowing document (e.g. a medical report, an invoice, and/or the like).

Figure 1D:
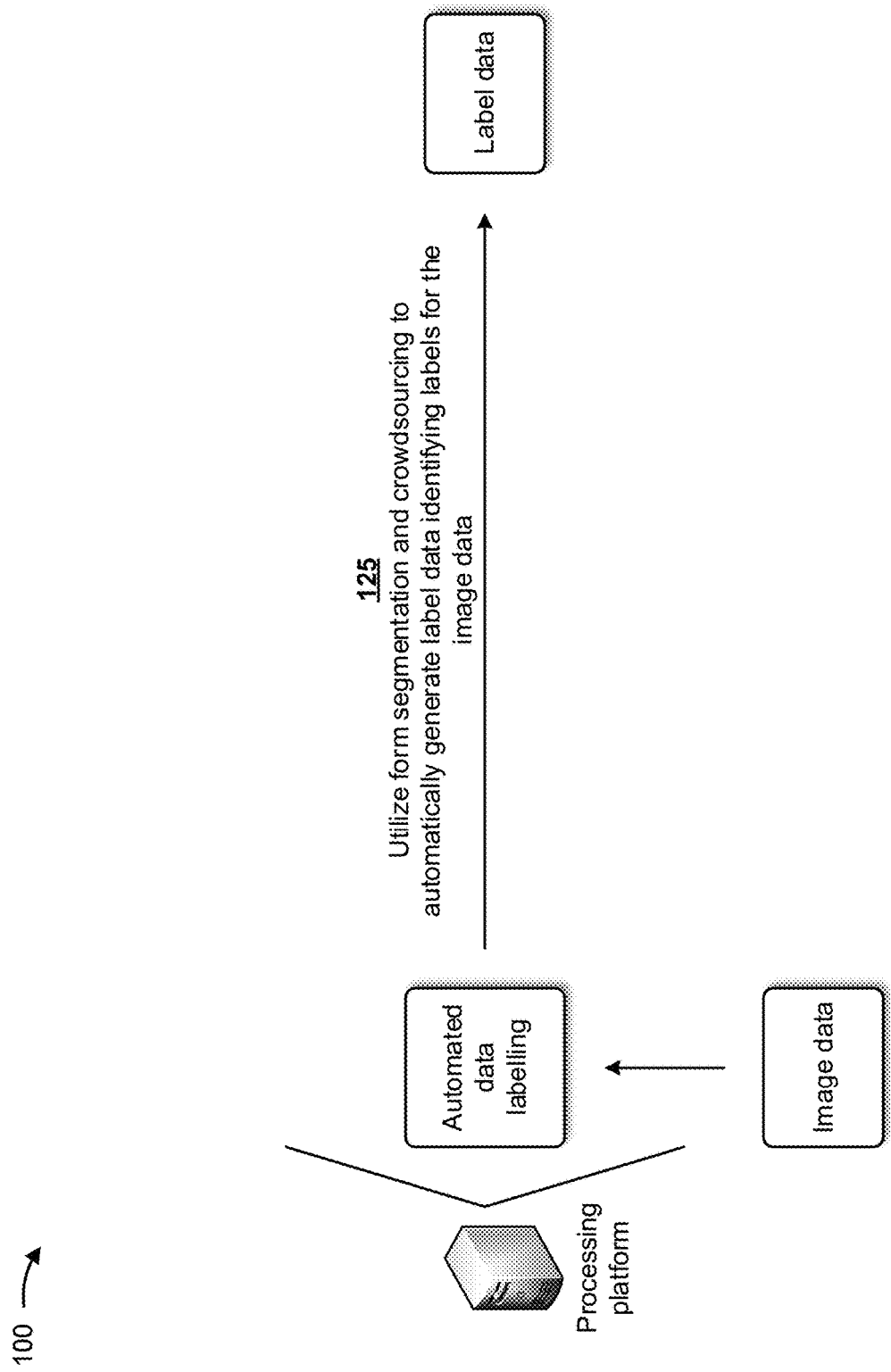

As shown in FIG. 1D, and by reference number 125, the processing platform may utilize form segmentation and/or crowdsourcing to automatically generate label data identifying labels for the image data. In some implementations, the processing platform may utilize form segmentation to automatically generate the label data. For example, when a document is a form, the processing platform may employ form segmentation to extract individual segments from the form to be labeled. In this way, the processing platform may enable custom built machine learning models to be created from extracted individual segments, and may also improve security by not sending an entire document for crowdsourcing, minimizing context, removing personal information, and/or the like.

In some implementations, the processing platform may utilize crowdsourcing to generate the label data. For example, the processing platform may employ a truth by consensus logic in which each labeling task is distributed to two individuals for processing, and results returned from each individual are compared. If the results are the same, then a consensus is reached, and the result is determined to be a correct label. If the results are different, the task is then sent to another individual for processing, and a new result is then compared against the previous two results. The process may be repeated until a consensus is found. In this way, the processing platform may provide an additional self-verification layer to maximize an accuracy of data labels.

Figure 1E:
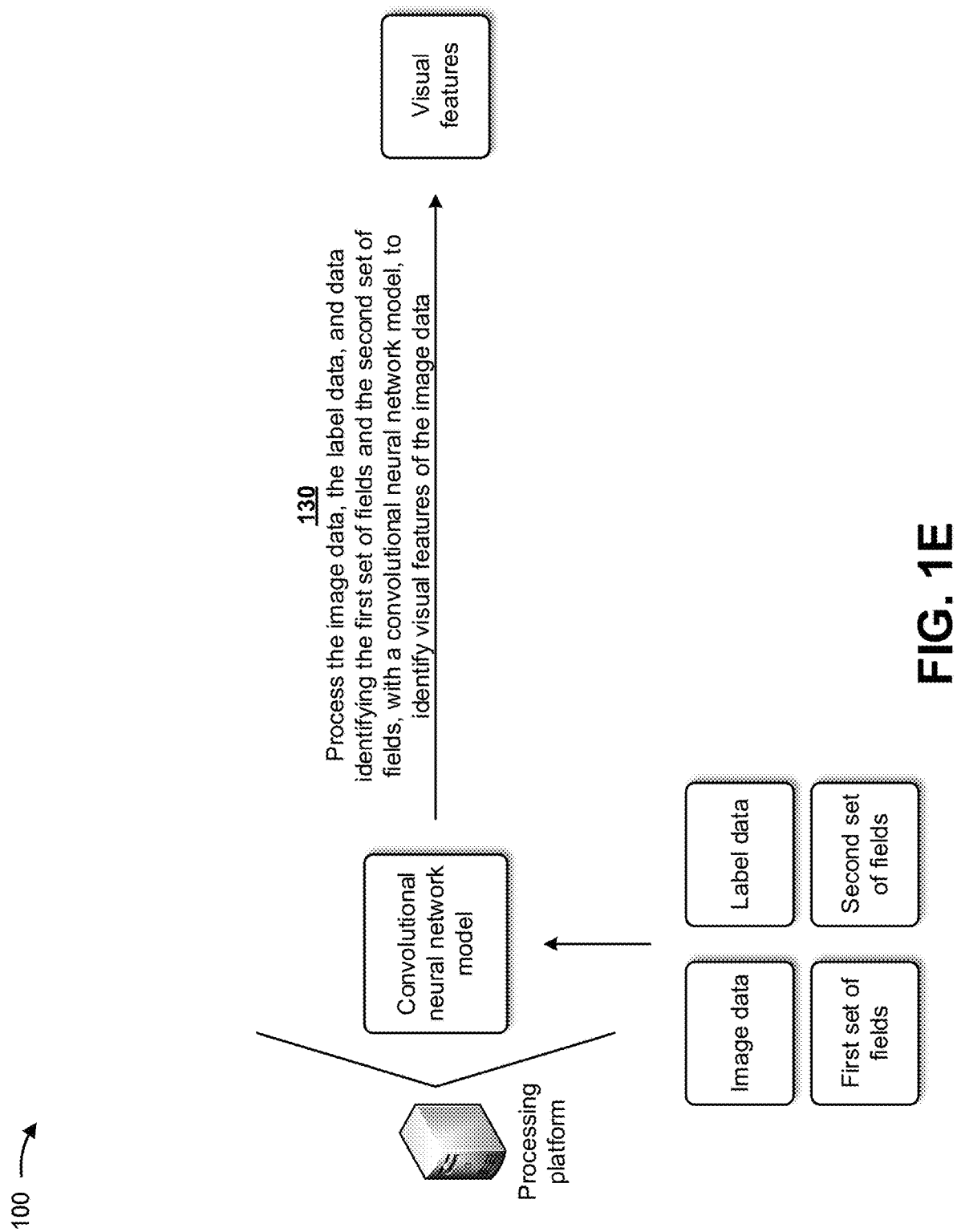

As shown in FIG. 1E, and by reference number 130, the processing platform may process the image data, the label data, and data identifying the first set of fields and the second set of fields, with a convolutional neural network model, to identify visual features of the image data. The convolutional neural network model may include successive two-dimensional convolutions with a rectified linear unit nonlinearity, and application of batch normalization and dropout following each of the two-dimensional convolutions. The visual features may be arranged in a grid that forms a sequential representation of the image of the document.

The convolutional neural network model may be a multi-layer convolutional neural network model. For example, the visual features of a source image may be extracted with the multi-layer convolutional neural network interleaved with max-pooling layers. Feeding the image through successive convolutional layers permits the convolutional neural network model to build a hierarchy of useful representations. As the convolution operation is agnostic to the size of the input image, the processing platform may accept and process images of arbitrary length. However, due to a relatively large amount of structure in input images, scaling an input image to a fixed aspect ratio, depending on the incoming image class to transcribe, may improve performance relative to a convolutional neural network model without restrictions on the aspect ratio, while being amenable to vectorization. The convolutional neural network model may use no fully connected layers, in order to preserve spatial locality of salient features.

The convolutional neural network model may include a residual block structure that consists of successive two-dimensional (2D) convolutions with a rectified linear unit (ReLU) nonlinearity and application of batch normalization and dropout following each convolution. For example, the convolutional block structures may include conventional convolutional blocks with 2×2 max pooling, followed by batch normalization (e.g., 2D convolution, 2×2 max pooling, batch normalization, and dropout); convolutional blocks which use a 2×1 rectangular receptive field in the pooling operation and permit greater retention of information in the width dimension, which determines the output sequence length (e.g., 2D convolution, 2×1 max pooling, batch normalization, and dropout); and residual blocks that permit greater network depth by decreasing the difficulty of optimization (e.g., 2D convolution, batch normalization, dropout, 2D convolution, batch normalization, and addition of identity mapping). The processing platform may use different permutations and combinations of each convolutional block depending on a class of an input image. The extracted compositional visual features may be fed into a downstream module as part of an end-to-end differentiable model.

The processing platform may train the convolutional neural network model with historical data (e.g., historical image data, historical label data, and historical data identifying the first set of fields and the second set of fields) to identify visual features of image data. For example, the processing platform may train the convolutional neural network model in a manner similar to the manner described below in connection with FIG. 2. The processing platform may train the convolutional neural network model with a data set that includes handwritten words, handwritten digits, alphanumeric characters, individual characters, extracted data that is labeled via crowdsourcing, and/or the like.

Rather than training the convolutional neural network model, the processing platform may obtain the convolutional neural network model from another system or device that trained the convolutional neural network model. In this case, the processing platform may provide the other system or device with historical data for use in training the convolutional neural network model, and may provide the other system or device with updated historical data to retrain the convolutional neural network model in order to update the convolutional neural network model.

When processing the image data, the label data, and the data identifying the first set of fields and the second set of fields, the processing platform may apply the convolutional neural network model in a manner similar to the manner described below in connection with FIG. 3.

Figure 1F:
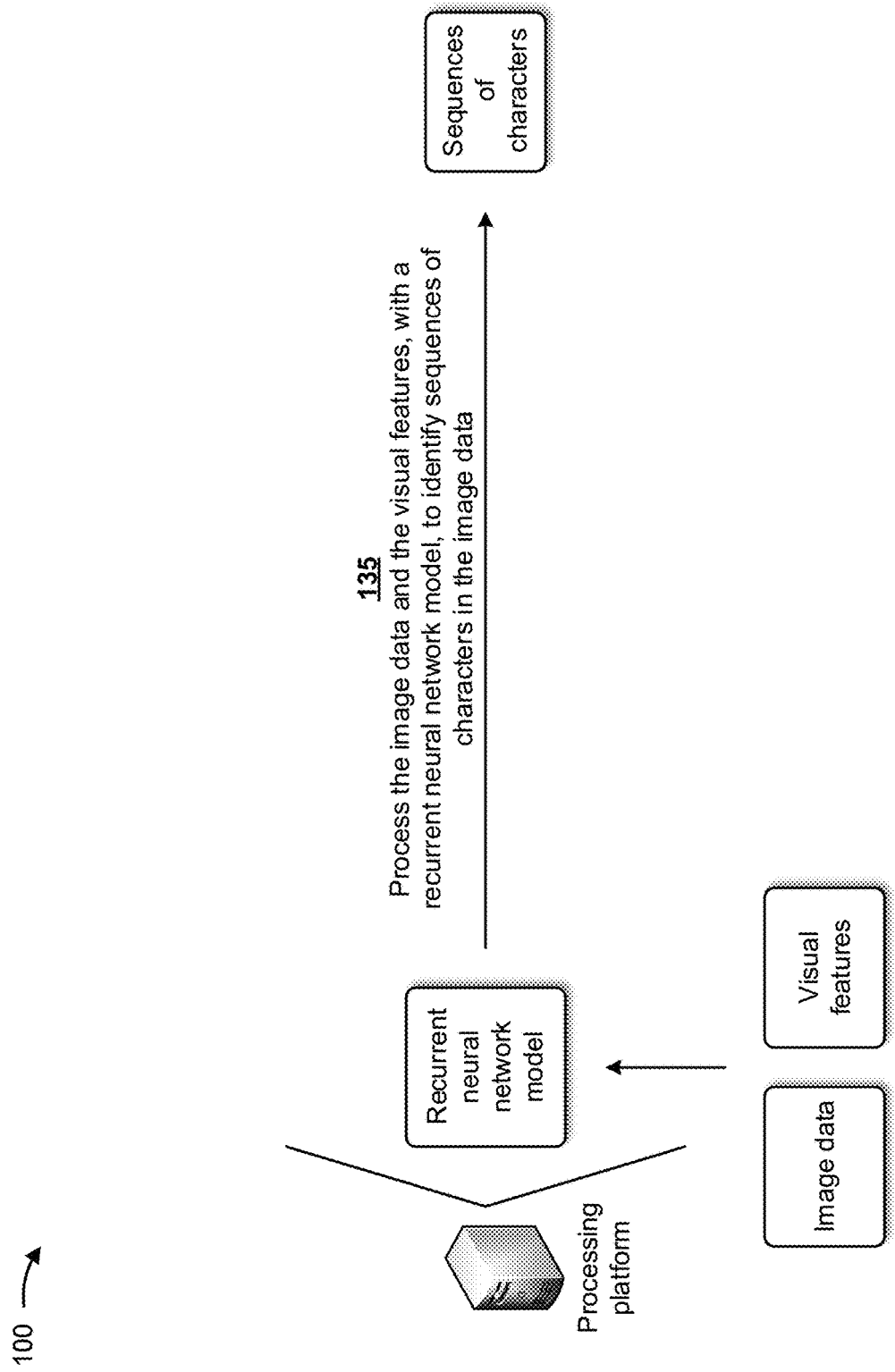

As shown in FIG. 1F, and by reference number 135, the processing platform may process the image data and the visual features, with a recurrent neural network model, to identify sequences of characters in the image data. The recurrent neural network model may include stacked multiple recurrent layers, skip-connections between an input and an output of each recurrent layer, and bidirectional recurrent neural networks.

The processing platform may pass a visual feature grid (e.g., the visual features) produced by the convolutional neural network to the recurrent neural network model, and the recurrent neural network model may function as a decoder of a standard encoder-decoder model. The recurrent neural network model may condition predictions on previously-observed visual features to capture long-range context within an image. Additionally, as the recurrent neural network model can process sequences of arbitrary length, the recurrent neural network model can handle images of arbitrary width.

The recurrent neural network model may include a standard gated recurrent unit (GRU)-based recurrent network that is modified in three ways. First, the memory and representational capacity of the recurrent network may be increased by stacking multiple recurrent layers to create a deep recurrent neural network. In contrast to increasing a dimensionality of a hidden layer, which would result in a quadratic increase in memory and computation due to the matrix-vector operations, stacking recurrent layers scales memory and computation requirements linearly. Second, skip-connections may be provided between the input and output of each layer in the stack, which provides a direct identity mapping between non-consecutive layers of the deep recurrent neural network so that each layer only has to learn a residual mapping instead of a full mapping. Third, the recurrent neural network model may be bidirectional. Since bidirectional recurrent neural networks indicate that network output at a timestep is a function of successor elements in a sequence in addition to preceding elements, this may increase performance on a variety of tasks. For example, in the case of handwriting recognition, bidirectionality may enable use of information to a left and a right of a current position to predict a character at that position. To achieve this, the recurrent neural network may be exposed to a reverse order of the input sequence in addition to a normal forward order.

The recurrent neural network model may employ regularization techniques to prevent overfitting. Furthermore, since deep learning architectures may be heavily overparameterized and may be capable of memorization of the training data, the recurrent neural network model may employ heavy regularization (e.g., modifications to the architecture which penalize model complexity).

The processing platform may train the recurrent neural network model with historical data (e.g., historical image data and historical visual features) to identify sequences of characters in image data. For example, the processing platform may train the recurrent neural network model in a manner similar to the manner described below in connection with FIG. 2. The processing platform may train the recurrent neural network model with a data set that includes handwritten words, handwritten digits, alphanumeric characters, individual characters, extracted data that is labeled via crowdsourcing, and/or the like.

Rather than training the recurrent neural network model, the processing platform may obtain the recurrent neural network model from another system or device that trained the recurrent neural network model. In this case, the processing platform may provide the other system or device with historical data for use in training the recurrent neural network model, and may provide the other system or device with updated historical data to retrain the recurrent neural network model in order to update the recurrent neural network model.

When processing the historical image data and historical visual features, the processing platform may apply the recurrent neural network model in a manner similar to the manner described below in connection with FIG. 3.

Figure 1G:
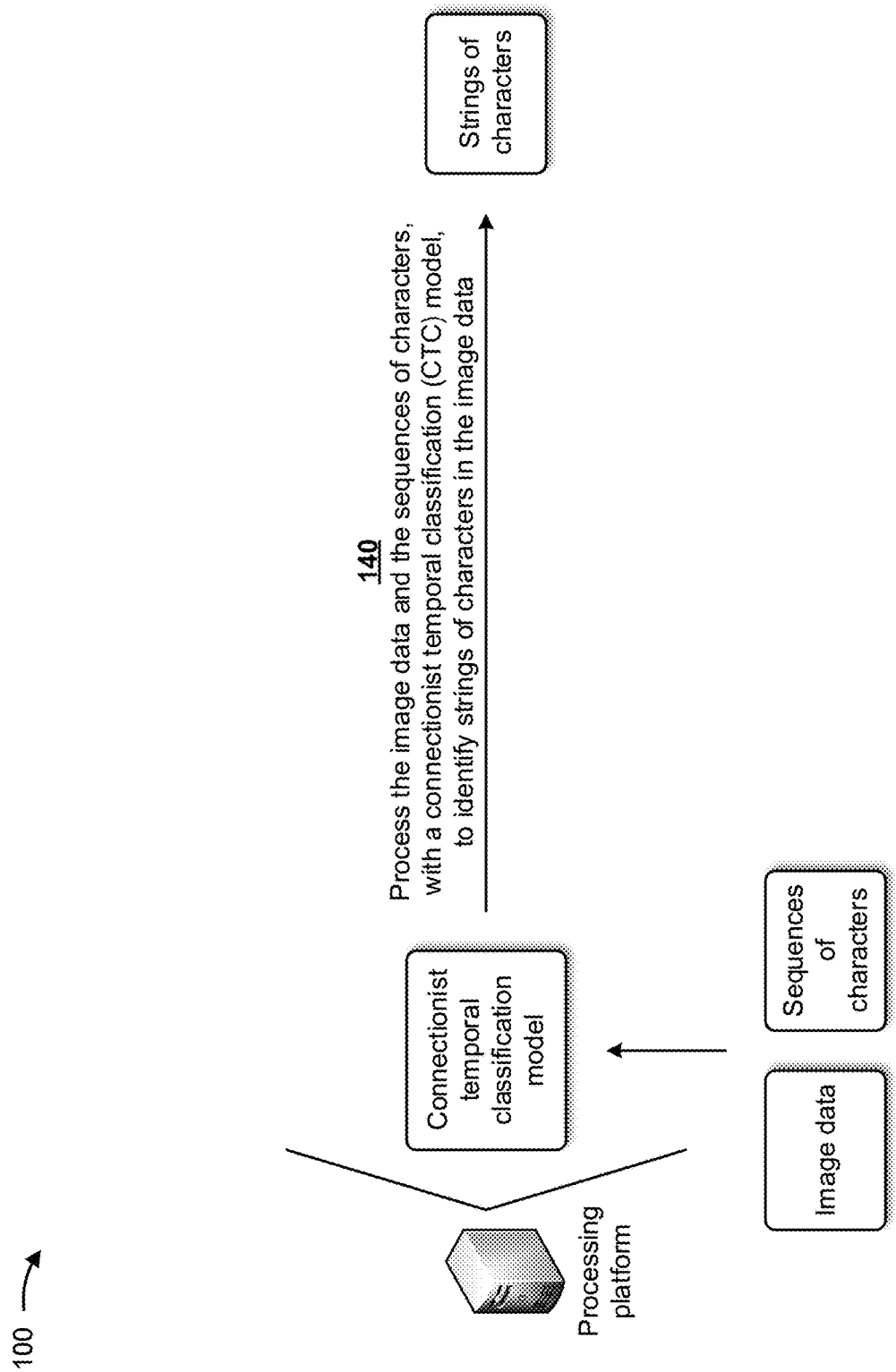

As shown in FIG. 1G, and by reference number 140, the processing platform may process the image data and the sequences of characters, with a connectionist temporal classification (CTC) model, to identify strings of characters in the image data. The connectionist temporal classification model may include a softmax model, a forward-backward model, and/or the like.

The connectionist temporal classification model may accept as input the output of the preceding recurrent neural network model (e.g., a raw sequence of characters), and may attempt to map the raw sequence of characters into a maximally probable output sequence of characters. The connectionist temporal classification model may use a softmax operation (e.g., with a differentiable option selection) to define a separate output probability distribution at each time step along an input sequence, where the distribution covers an entire vocabulary in addition to an additional blank symbol (e.g., corresponding to a null output). The connectionist temporal classification model may determine which label to emit, or no label at all, at each timestep. In this way, the connectionist temporal classification model may define a distribution over all possible alignments between the input sequence, represented by the output of the intermediate recurrent neural network, and the target sequence. The connectionist temporal classification model may then employ a forward-backward algorithm to marginalize over all possible alignments to determine a final probability of the target sequence, given the input sequence.

The processing platform may train the connectionist temporal classification model with historical data (e.g., historical image data and historical sequences of characters) to identify strings of characters in image data. For example, the processing platform may train the connectionist temporal classification model in a manner similar to the manner described below in connection with FIG. 2. The processing platform may train the connectionist temporal classification model with a data set that includes handwritten words, handwritten digits, alphanumeric characters, individual characters, data that is labeled via crowdsourcing, and/or the like.

Rather than training the connectionist temporal classification model, the processing platform may obtain the connectionist temporal classification model from another system or device that trained the connectionist temporal classification model. In this case, the processing platform may provide the other system or device with historical data for use in training the connectionist temporal classification model, and may provide the other system or device with updated historical data to retrain the connectionist temporal classification model in order to update the connectionist temporal classification model.

When processing the image data and the sequences of characters, the processing platform may apply the connectionist temporal classification model in a manner similar to the manner described below in connection with FIG. 3.

Figure 1H:
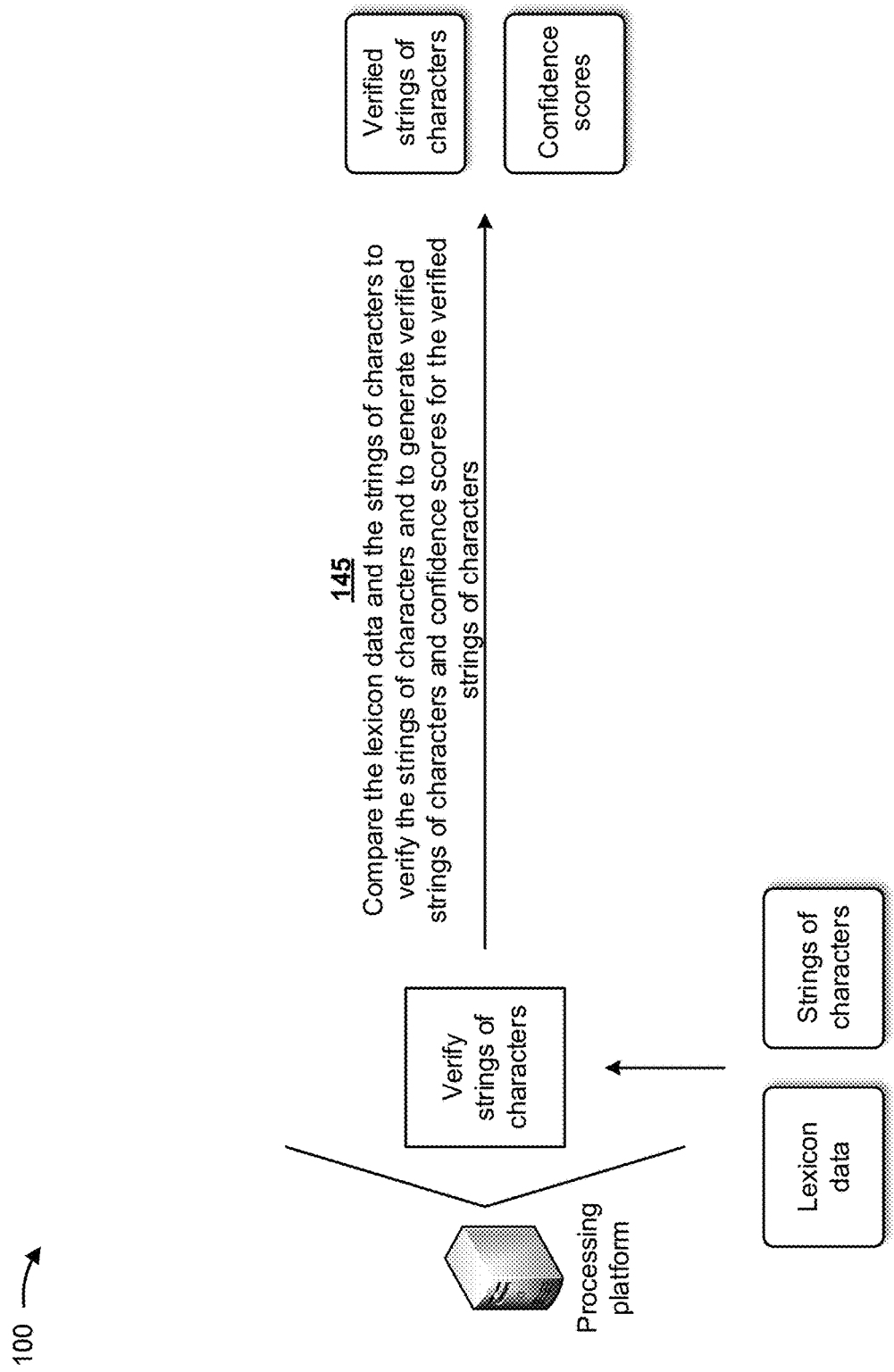

As shown in FIG. 1H, and by reference number 145, the processing platform may compare the lexicon data and the strings of characters to verify the strings of characters and to generate verified strings of characters and confidence scores for the verified strings of characters. The processing platform may provide a user interface for a user to create a customized lexicon. When comparing the lexicon data and the strings of characters, the processing platform may identify a topic associated with the documents, may identify a portion of the lexicon data that is associated with the topic, and may compare the portion of the lexicon data and the strings of characters to verify the strings of characters and to generate the verified strings of characters and the confidence scores. In some cases, the processing platform may identify a portion of the lexicon data that exactly matches the topic. In other cases, if the processing platform fails to identify a portion of the lexicon data that exactly matches the topic, the processing platform may determine a closest match (e.g., based on weightings applied to words in the lexicon).

The lexicon data may be associated with a tree data structure, and the processing platform may traverse the tree data structure to find a node that exactly matches, or most closely matches, a topic. For example, if a topic is "4002", the processing platform may identify a node for "4002" in a lexicon associated with a range of numerical values to find an exact match. As another example, if a topic is "400i", the processing platform may identify a node for "4001" to find a closest match. In this way, the processing platform may enable a user to have higher confidence in the outcome of processing by the processing platform.

Figure 1I:
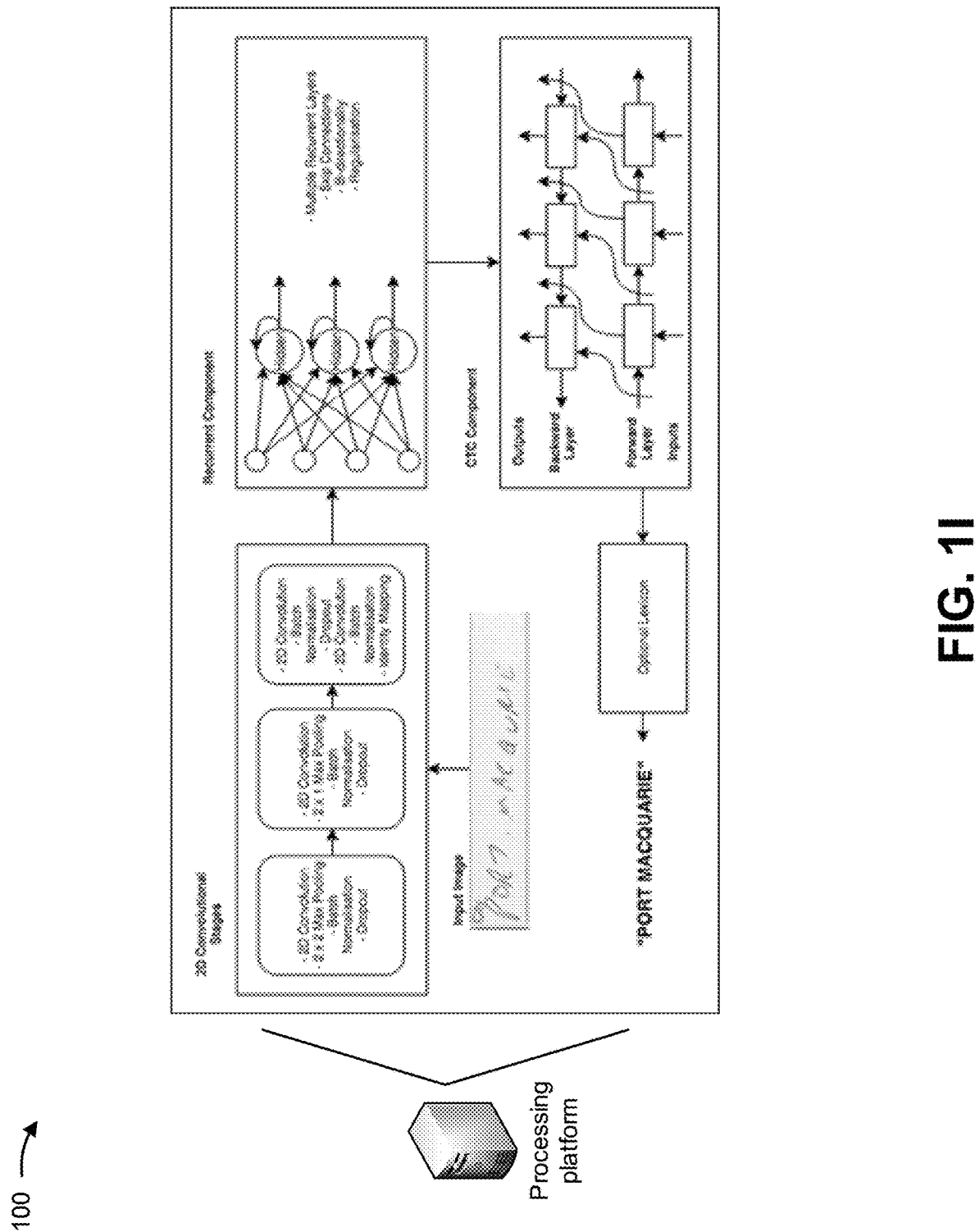

FIG. 1I provides an example of the processing platform processing an input image that includes handwriting. The processing platform may use OCR to read text in the input image, may use extraction to identify a field in the input image and to locate a rotation, a zoom and a position of the field, and may use form segmentation and crowdsourcing to identify labels for the input image. The convolutional neural network may process the input image, the labels, and data identifying the field in 2D convolutional stages, as shown, to produce a visual feature grid. The recurrent neural network model may provide stacks on top of the convolutional neural network and use multiple recurrent layers to process the visual feature grid (e.g., with a recurrent neural network that employs skip connections, bi-directionality, and regularization), to produce character sequences. The connectionist temporal classification model may process the character sequences with a forward layer and backward layer, as shown, to identify character strings with a highest probability of verification. The processing platform may then apply the lexicon to generate verified strings of characters. For example, the handwriting may be verified to match the string "PORT MACQUARIE."

The processing platform may provide a pipeline of successive and/or customizable functions that allow a user to perform tasks important to processing image-based documents. For example, the processing platform may include a user interface that allows the user to create decision points within the overall process, and to select and/or customize the components, such as for a particular type of document, for a particular purpose, and/or the like. Additionally, the user interface may provide a level of customization that allows the user to maintain control over which pipelines are active, as well as the final format and output of the data extracted from the forms.

In this way, the processing platform may pre-emptively remove repetitive manual work and eliminate a significant amount of human error related to data entry. With an understanding of the business process, a user can spend time configuring the business aspects of the process (e.g., transforming data into a format that is useful to the business). The processing platform may thereby allow users, by configuring the input, output, and processing of the data, to automate processes that may be hindered by form processing. Furthermore, the processing platform may allow users to integrate one or more processing functions, that are particular to a business, with each other and/or with other aspects of the business. For example, processing a bank loan application may include processing a number of different documents (e.g., a bank statement, a passport, invoices, and/or the like), and a user of the processing platform may employ the pipeline configuration to integrate the processing of the different documents together, as well as potentially integrate the pipeline into other systems involved in the loan application process.

Figure 1J:
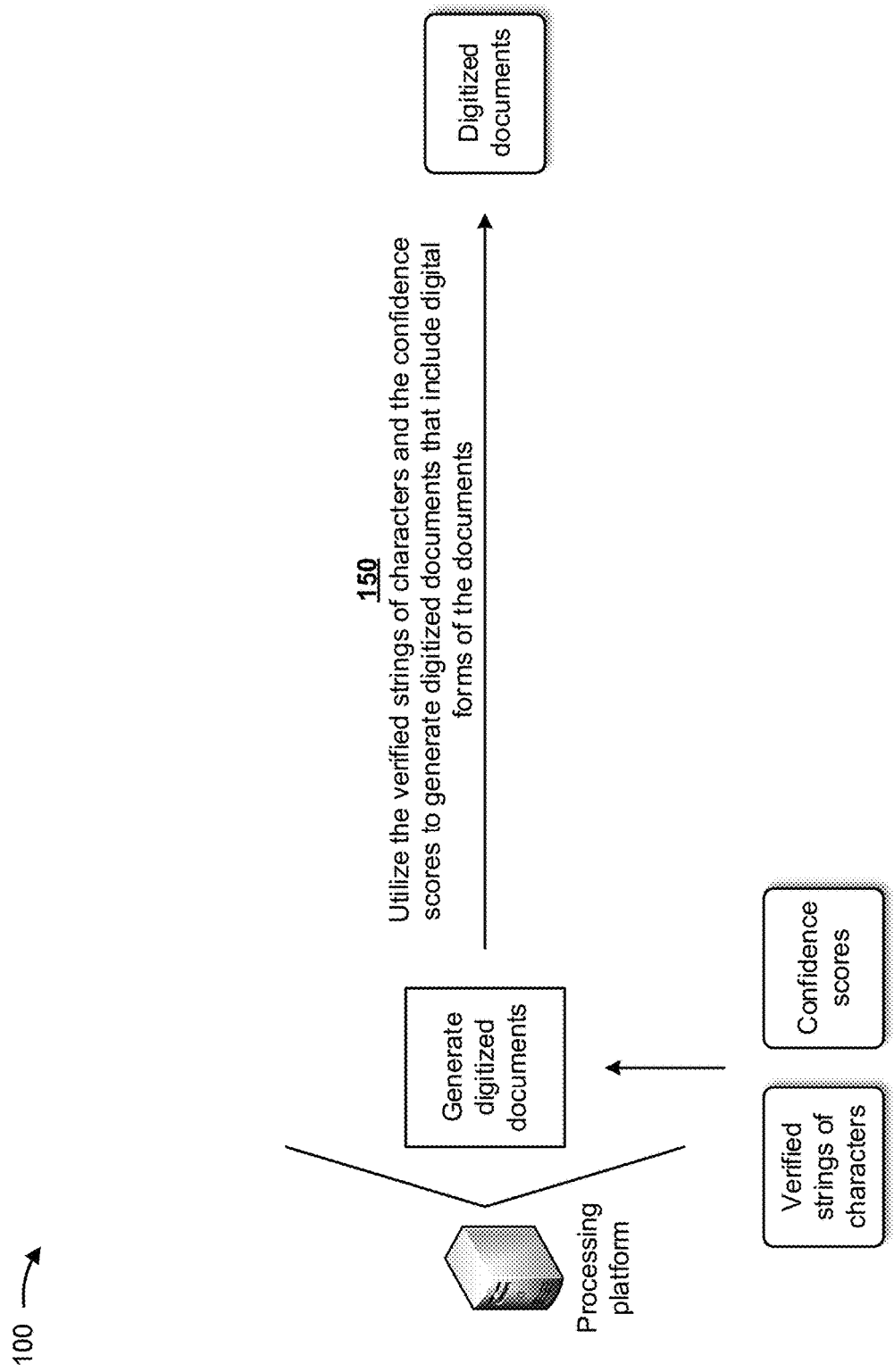

As shown in FIG. 1J, and by reference number 150, the processing platform may utilize the verified strings of characters and the confidence scores to generate digitized documents that include digital forms of the documents. For example, the processing platform may combine verified strings of characters of a document together, based on confidence scores of the verified strings of characters, in order to generate a digitized document. The processing platform may repeat this process for each of the documents included in the image data.

Figure 1K:
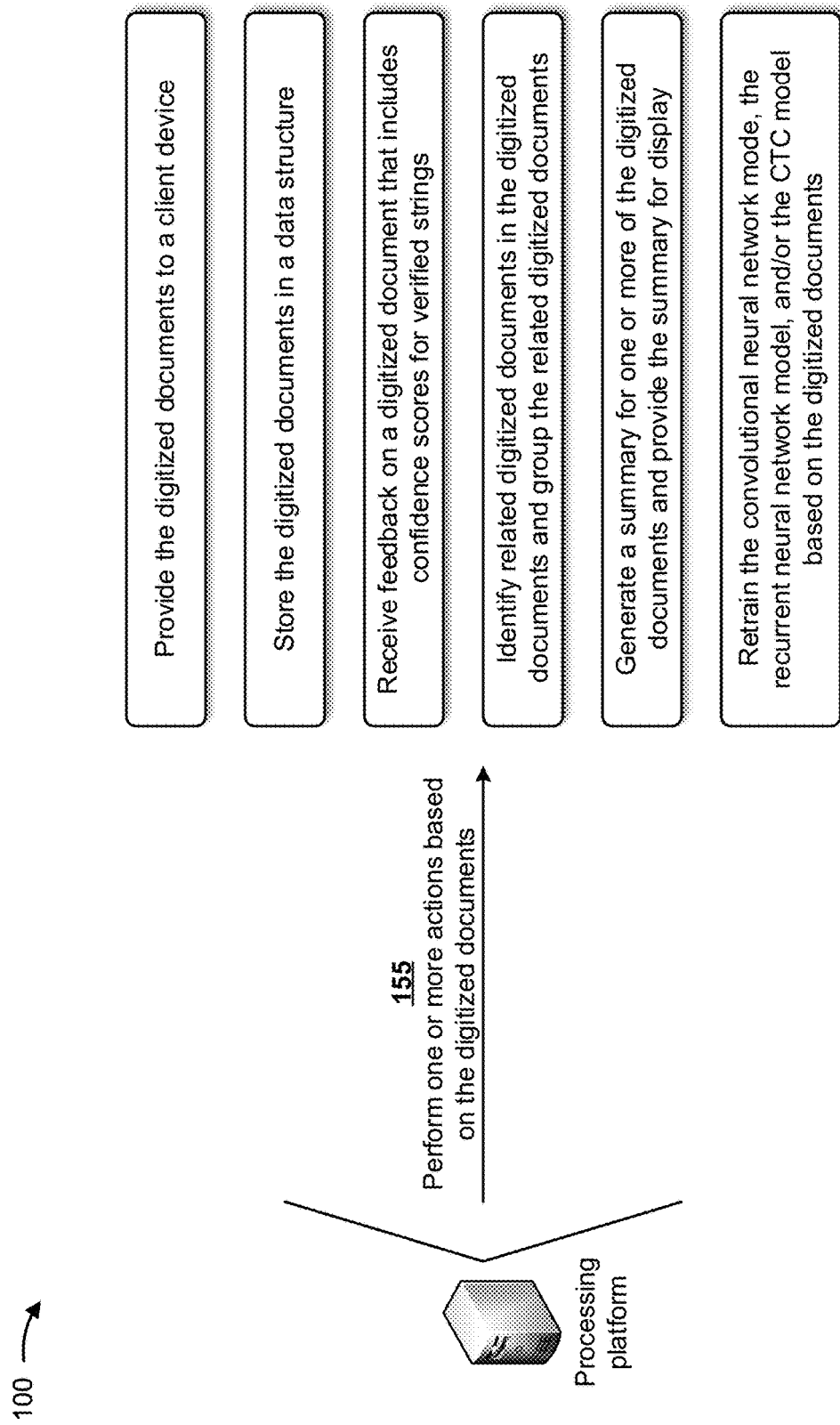

As shown in FIG. 1K, and by reference number 155, the processing platform may perform one or more actions based on the digitized documents. The one or more actions may include the processing platform providing the digitized documents to a client device. For example, the processing platform may automatically provide the digitized documents to users associated with processing the corresponding image-based documents, to end-users (e.g., vendors, customers, applicants, providers, and/or the like) of processes associated with the digitized documents, and/or the like. In this way, the processing platform may enable a user or an end-user associated with the client device to consume, apply, process, and/or the like content of the digitized documents. For example, if a digitized document is a loan application, a loan provider may utilize the digitized document to process the loan based on the content of the loan application. This may conserve computing resources, networking resources, human resources, and/or the like that would otherwise be required to manually provide the digitized documents.

The one or more actions may include the processing platform storing the digitized documents in a data structure. For example, the processing platform may store the digitized documents in a database, a table, a list, and/or the like associated with the processing platform. The client device may access the digitized documents from the database and display the digitized documents, portions of the digitized documents, information associated with the digitized documents, results of processing the image-based documents, and/or the like. In this way, the user may view the digitized documents, results of processing the image-based documents, and/or the like, which may improve processing of image-based documents and conserve computing resources, networking resources, and/or the like associated with processing the image-based documents.

The one or more actions may include the processing platform receiving feedback on a digitized document that includes confidence scores for verified strings. For example, a user of the processing platform may provide feedback, on a digitized document, that assesses an accuracy of verified strings of the digitized document, confidence scores for the verified strings, and/or the like, which may enable the processing platform to adjust processing functions (e.g., extraction functions, machine learning models, lexicon functions, and/or the like) utilized to verify strings, generate the confidence scores, and/or the like, which may improve the speed and the efficiency of the processing platform.

The one or more actions may include the processing platform identifying related digitized documents in the digitized documents and grouping the related digitized documents. For example, the processing platform may identify and group digitized documents related by industry (e.g., banking, postal, and/or the like), by business function (e.g., a loan application), by user or end-user, by document type, and/or the like. In this way, the processing platform may improve efficiency in processing image-based documents, in performing functions associated with the digitized documents, and/or the like.

The one or more actions may include the processing platform generating a summary for one or more of the digitized documents and providing the summary for display. For example, the processing platform may generate a summary that includes data identifying a document type (e.g., a business form) of a digitized document, fields identified in the digitized document, field characteristics (e.g., printed or handwritten text), accuracy of results, and/or the like. In this way, the processing platform may provide a user with a confidence level associated with information contained in the digitized document, which may enable the user to determine whether to utilize the digitized document.

The one or more actions may include the processing platform retraining the convolutional neural network mode, the recurrent neural network model, and/or the connectionist temporal classification model based on the digitized documents. In this way, the processing platform may improve the accuracy of the convolutional neural network model in processing the image data, the label data, and data identifying the first set of fields and the second set of fields to identify visual features of the image data, may improve the accuracy of the recurrent neural network model in processing the image data and the visual features to identify sequences of characters in the image data, and/or may improve the accuracy of the connectionist temporal classification model in processing the image data and the sequences of characters to identify strings of characters in the image data. This, in turn, may improve speed and efficiency of the convolutional neural network mode, the recurrent neural network model, and/or the connectionist temporal classification model, and thereby conserve computing resources, networking resources, and/or the like.

In this way, several different stages of the process for processing image-based documents are automated via machine learning, position based extraction, and automated data labeling, which may remove human subjectivity and waste from the process, and which may improve speed and efficiency of the process and conserve computing resources (e.g., processing resources, memory resources, communication resources, and/or the like), networking resources, and/or the like. Furthermore, implementations described herein use a rigorous, computerized process to perform tasks or roles that were not previously performed or were previously performed using subjective human intuition or input. For example, currently there does not exist a technique that utilizes machine learning models, position based extraction, and automated data labeling to process image-based documents in the manner described herein. Finally, the process for utilizing machine learning models, position based extraction, and automated data labeling to process image-based documents conserves computing resources, networking resources, and/or the like that would otherwise be wasted in manually processing documents, generating incorrect digital forms of the documents, correcting the incorrect digital forms of the documents if discovered, and/or like.

As indicated above, FIGS. 1A-1K are provided merely as examples. Other examples may differ from what is described with regard to FIGS. 1A-1K.

Figure 2:
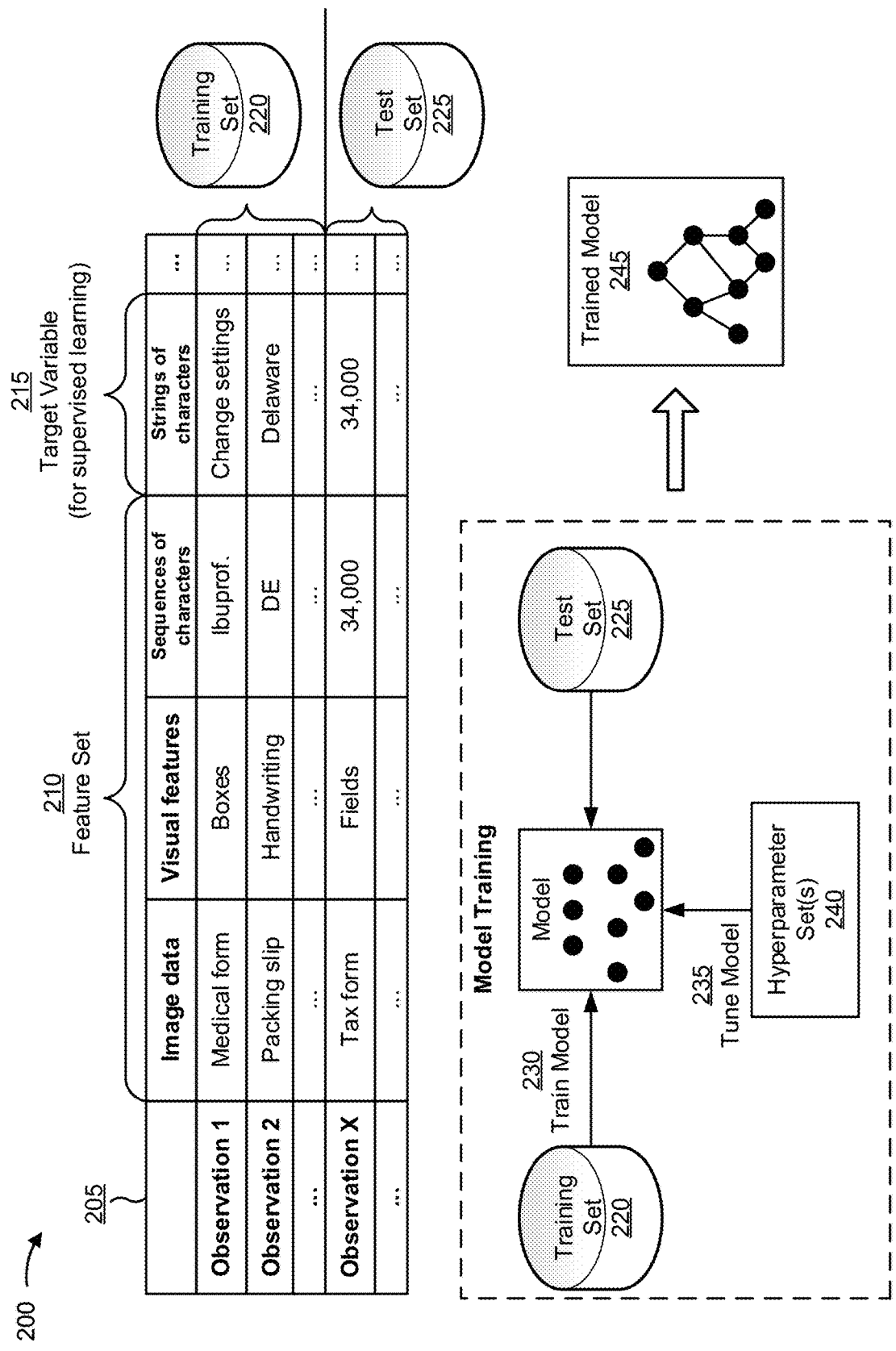
FIG. 2 is a diagram illustrating an example of training a machine learning model.

FIG. 2 is a diagram illustrating an example 200 of training a machine learning model. The machine learning model training described herein may be performed using a machine learning system. The machine learning system may include a computing device, a server, a cloud computing environment, and/or the like, such as the client device and/or the processing platform.

As shown by reference number 205, a machine learning model may be trained using a set of observations. The set of observations may be obtained and/or input from historical data, such as data gathered during one or more processes described herein. For example, the set of observations may include data gathered from user interaction with and/or user input to the processing platform, as described elsewhere herein. In some implementations, the machine learning system may receive the set of observations (e.g., as input) from the client device.

As shown by reference number 210, a feature set may be derived from the set of observations. The feature set may include a set of variable types. A variable type may be referred to as a feature. A specific observation may include a set of variable values corresponding to the set of variable types. A set of variable values may be specific to an observation. In some cases, different observations may be associated with different sets of variable values, sometimes referred to as feature values. In some implementations, the machine learning system may determine variable values for a specific observation based on input received from the client device. For example, the machine learning system may identify a feature set (e.g., one or more features and/or corresponding feature values) from structured data input to the machine learning system, such as by extracting data from a particular column of a table, extracting data from a particular field of a form, extracting data from a particular field of a message, extracting data received in a structured data format, and/or the like. In some implementations, the machine learning system may determine features (e.g., variables types) for a feature set based on input received from the client device, such as by extracting or generating a name for a column, extracting or generating a name for a field of a form and/or a message, extracting or generating a name based on a structured data format, and/or the like. Additionally, or alternatively, the machine learning system may receive input from an operator to determine features and/or feature values. In some implementations, the machine learning system may perform natural language processing and/or another feature identification technique to extract features (e.g., variable types) and/or feature values (e.g., variable values) from text (e.g., unstructured data) input to the machine learning system, such as by identifying keywords and/or values associated with those keywords from the text.

As an example, a feature set for a set of observations may include a first feature of image data, a second feature of visual features, a third feature of sequences of characters, and so on. As shown, for a first observation, the first feature may have a value of a medical form, the second feature may have a value of boxes, the third feature may have a value of ibuprof., and so on. These features and feature values are provided as examples, and may differ in other examples. For example, the feature set may include one or more of the following features: image data (e.g., images of documents to be digitized); visual features (e.g., boxes, fields, headers, footers, and/or the like in the documents); sequences of characters (e.g., letters, numbers, combinations of letters and numbers, words, and/or the like); and/or the like. In some implementations, the machine learning system may pre-process and/or perform dimensionality reduction to reduce the feature set and/or combine features of the feature set to a minimum feature set. A machine learning model may be trained on the minimum feature set, thereby conserving resources of the machine learning system (e.g., processing resources, memory, and/or the like) used to train the machine learning model.

As shown by reference number 215, the set of observations may be associated with a target variable type (e.g., strings of characters). The target variable type may represent a variable having a numeric value (e.g., an integer value, a floating point value, and/or the like), may represent a variable having a numeric value that falls within a range of values or has some discrete possible values, may represent a variable that is selectable from one of multiple options (e.g., one of multiples classes, classifications, labels, and/or the like), may represent a variable having a Boolean value (e.g., 0 or 1, True or False, Yes or No), and/or the like. A target variable type may be associated with a target variable value, and a target variable value may be specific to an observation. In some cases, different observations (e.g., different words, phrases, sentences, and/or the like) may be associated with different target variable values.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model, a predictive model, and/or the like. When the target variable type is associated with continuous target variable values (e.g., a range of numbers and/or the like), the machine learning model may employ a regression technique. When the target variable type is associated with categorical target variable values (e.g., classes, labels, and/or the like), the machine learning model may employ a classification technique.

In some implementations, the machine learning model may be trained on a set of observations that do not include a target variable (or that include a target variable, but the machine learning model is not being executed to predict the target variable). This may be referred to as an unsupervised learning model, an automated data analysis model, an automated signal extraction model, and/or the like. In this case, the machine learning model may learn patterns from the set of observations without labeling or supervision, and may provide output that indicates such patterns, such as by using clustering and/or association to identify related groups of items within the set of observations.

As further shown, the machine learning system may partition the set of observations into a training set 220 that includes a first subset of observations, of the set of observations, and a test set 225 that includes a second subset of observations of the set of observations. The training set 220 may be used to train (e.g., fit, tune, and/or the like) the machine learning model, while the test set 225 may be used to evaluate a machine learning model that is trained using the training set 220. For example, for supervised learning, the test set 220 may be used for initial model training using the first subset of observations, and the test set 225 may be used to test whether the trained model accurately predicts target variables in the second subset of observations. In some implementations, the machine learning system may partition the set of observations into the training set 220 and the test set 225 by including a first portion or a first percentage of the set of observations in the training set 220 (e.g., 75%, 80%, or 85%, among other examples) and including a second portion or a second percentage of the set of observations in the test set 225 (e.g., 25%, 20%, or 15%, among other examples). In some implementations, the machine learning system may randomly select observations to be included in the training set 220 and/or the test set 225.

As shown by reference number 230, the machine learning system may train a machine learning model using the training set 220. This training may include executing, by the machine learning system, a machine learning algorithm to determine a set of model parameters based on the training set 220. In some implementations, the machine learning algorithm may include a regression algorithm (e.g., linear regression, logistic regression, and/or the like), which may include a regularized regression algorithm (e.g., Lasso regression, Ridge regression, Elastic-Net regression, and/or the like). Additionally, or alternatively, the machine learning algorithm may include a decision tree algorithm, which may include a tree ensemble algorithm (e.g., generated using bagging and/or boosting), a random forest algorithm, a boosted trees algorithm, and/or the like. A model parameter may include an attribute of a machine learning model that is learned from data input into the model (e.g., the training set 220). For example, for a regression algorithm, a model parameter may include a regression coefficient (e.g., a weight). For a decision tree algorithm, a model parameter may include a decision tree split location, as an example.

As shown by reference number 235, the machine learning system may use one or more hyperparameter sets 240 to tune the machine learning model. A hyperparameter may include a structural parameter that controls execution of a machine learning algorithm by the machine learning system, such as a constraint applied to the machine learning algorithm. Unlike a model parameter, a hyperparameter is not learned from data input into the model. An example hyperparameter for a regularized regression algorithm includes a strength (e.g., a weight) of a penalty applied to a regression coefficient to mitigate overfitting of the machine learning model to the training set 220. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), may be applied by setting one or more feature values to zero (e.g., for automatic feature selection), and/or the like. Example hyperparameters for a decision tree algorithm include a tree ensemble technique to be applied (e.g., bagging, boosting, a random forest algorithm, a boosted trees algorithm, and/or the like), a number of features to evaluate, a number of observations to use, a maximum depth of each decision tree (e.g., a number of branches permitted for the decision tree), a number of decision trees to include in a random forest algorithm, and/or the like.

To train a machine learning model, the machine learning system may identify a set of machine learning algorithms to be trained (e.g., based on operator input that identifies the one or more machine learning algorithms, based on random selection of a set of machine learning algorithms, and/or the like), and may train the set of machine learning algorithms (e.g., independently for each machine learning algorithm in the set) using the training set 220. The machine learning system may tune each machine learning algorithm using one or more hyperparameter sets 240 (e.g., based on operator input that identifies hyperparameter sets 240 to be used, based on randomly generating hyperparameter values, and/or the like). The machine learning system may train a particular machine learning model using a specific machine learning algorithm and a corresponding hyperparameter set 240. In some implementations, the machine learning system may train multiple machine learning models to generate a set of model parameters for each machine learning model, where each machine learning model corresponds to a different combination of a machine learning algorithm and a hyperparameter set 240 for that machine learning algorithm.

In some implementations, the machine learning system may perform cross-validation when training a machine learning model. Cross validation can be used to obtain a reliable estimate of machine learning model performance using only the training set 220, and without using the test set 225, such as by splitting the training set 220 into a number of groups (e.g., based on operator input that identifies the number of groups, based on randomly selecting a number of groups, and/or the like) and using those groups to estimate model performance. For example, using k-fold cross-validation, observations in the training set 220 may be split into k groups (e.g., in order or at random). For a training procedure, one group may be marked as a hold-out group, and the remaining groups may be marked as training groups. For the training procedure, the machine learning system may train a machine learning model on the training groups and then test the machine learning model on the hold-out group to generate a cross-validation score. The machine learning system may repeat this training procedure using different hold-out groups and different test groups to generate a cross-validation score for each training procedure. In some implementations, the machine learning system may independently train the machine learning model k times, with each individual group being used as a hold-out group once and being used as a training group k−1 times. The machine learning system may combine the cross-validation scores for each training procedure to generate an overall cross-validation score for the machine learning model. The overall cross-validation score may include, for example, an average cross-validation score (e.g., across all training procedures), a standard deviation across cross-validation scores, a standard error across cross-validation scores, and/or the like.

In some implementations, the machine learning system may perform cross-validation when training a machine learning model by splitting the training set into a number of groups (e.g., based on operator input that identifies the number of groups, based on randomly selecting a number of groups, and/or the like). The machine learning system may perform multiple training procedures and may generate a cross-validation score for each training procedure. The machine learning system may generate an overall cross-validation score for each hyperparameter set 240 associated with a particular machine learning algorithm. The machine learning system may compare the overall cross-validation scores for different hyperparameter sets 240 associated with the particular machine learning algorithm, and may select the hyperparameter set 240 with the best (e.g., highest accuracy, lowest error, closest to a desired threshold, and/or the like) overall cross-validation score for training the machine learning model. The machine learning system may then train the machine learning model using the selected hyperparameter set 240, without cross-validation (e.g., using all data in the training set 220 without any hold-out groups), to generate a single machine learning model for a particular machine learning algorithm. The machine learning system may then test this machine learning model using the test set 225 to generate a performance score, such as a mean squared error (e.g., for regression), a mean absolute error (e.g., for regression), an area under receiver operating characteristic curve (e.g., for classification), and/or the like. If the machine learning model performs adequately (e.g., with a performance score that satisfies a threshold), then the machine learning system may store that machine learning model as a trained machine learning model 245 to be used to analyze new observations, as described below in connection with FIG. 3.

In some implementations, the machine learning system may perform cross-validation, as described above, for multiple machine learning algorithms (e.g., independently), such as a regularized regression algorithm, different types of regularized regression algorithms, a decision tree algorithm, different types of decision tree algorithms, and/or the like. Based on performing cross-validation for multiple machine learning algorithms, the machine learning system may generate multiple machine learning models, where each machine learning model has the best overall cross-validation score for a corresponding machine learning algorithm. The machine learning system may then train each machine learning model using the entire training set 220 (e.g., without cross-validation), and may test each machine learning model using the test set 225 to generate a corresponding performance score for each machine learning model. The machine learning model may compare the performance scores for each machine learning model, and may select the machine learning model with the best (e.g., highest accuracy, lowest error, closest to a desired threshold, and/or the like) performance score as the trained machine learning model 245.

As indicated above, FIG. 2 is provided as an example. Other examples may differ from what is described in connection with FIG. 2. For example, the machine learning model may be trained using a different process than what is described in connection with FIG. 2. Additionally, or alternatively, the machine learning model may employ a different machine learning algorithm than what is described in connection with FIG. 2, such as a Bayesian estimation algorithm, a k-nearest neighbor algorithm, an a priori algorithm, a k-means algorithm, a support vector machine algorithm, a neural network algorithm (e.g., a convolutional neural network algorithm), a deep learning algorithm, and/or the like.

Figure 3:
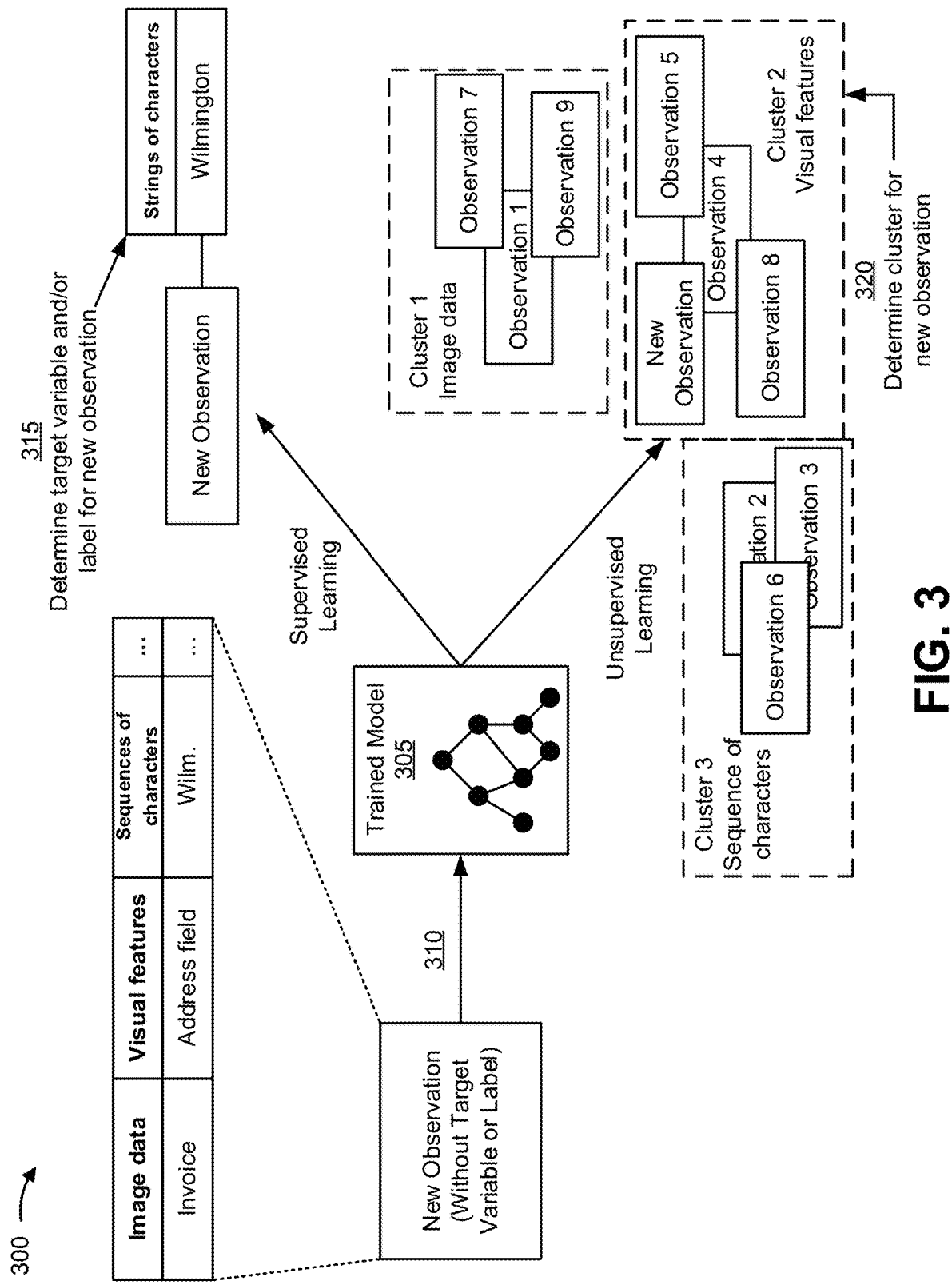
FIG. 3 is a diagram illustrating an example of applying a trained machine learning model to a new observation.

FIG. 3 is a diagram illustrating an example 300 of applying a trained machine learning model to a new observation. The new observation may be input to a machine learning system that stores a trained machine learning model 305. In some implementations, the trained machine learning model 305 may be the trained machine learning model 245 described above in connection with FIG. 2. The machine learning system may include a computing device, a server, a cloud computing environment, and/or the like, such as the processing platform.

As shown by reference number 310, the machine learning system may receive a new observation (or a set of new observations), and may input the new observation to the machine learning model 305. As shown, the new observation may include a first feature of image data (e.g., an invoice), a second feature of visual features (e.g., an address field), a third feature of sequences of characters (e.g., Wilm.), and so on, as an example. The machine learning system may apply the trained machine learning model 305 to the new observation to generate an output (e.g., a result). The type of output may depend on the type of machine learning model and/or the type of machine learning task being performed. For example, the output may include a predicted (e.g., estimated) value of a target variable (e.g., a value within a continuous range of values, a discrete value, a label, a class, a classification, and/or the like), such as when supervised learning is employed. Additionally, or alternatively, the output may include information that identifies a cluster to which the new observation belongs, information that indicates a degree of similarity between the new observations and one or more prior observations (e.g., which may have previously been new observations input to the machine learning model and/or observations used to train the machine learning model), and/or the like, such as when unsupervised learning is employed.

In some implementations, the trained machine learning model 305 may predict "Wilmington" for the target variable of strings of characters, as shown by reference number 315. Based on this prediction (e.g., based on the value having a particular label/classification, based on the value satisfying or failing to satisfy a threshold, and/or the like), the machine learning system may provide a recommendation, such as use Wilmington as a city for the address field. Additionally, or alternatively, the machine learning system may perform an automated action and/or may cause an automated action to be performed (e.g., by instructing another device to perform the automated action), such as replacing "Wilm." with "Wilmington" in the image data. As another example, if the machine learning system were to predict a value of "Wilmont" for the target variable of strings of characters, then the machine learning system may provide a different recommendation (e.g., use Wilmont as a city for the address field) and/or may perform or cause performance of a different automated action (e.g., replacing "Wilm." with "Wilmont" in the image data). In some implementations, the recommendation and/or the automated action may be based on the target variable value having a particular label (e.g., classification, categorization, and/or the like), may be based on whether the target variable value satisfies one or more thresholds (e.g., whether the target variable value is greater than a threshold, is less than a threshold, is equal to a threshold, falls within a range of threshold values, and/or the like), and/or the like.

In some implementations, the trained machine learning model 305 may classify (e.g. cluster) the new observation in an action cluster, as shown by reference number 320. The observations within a cluster may have a threshold degree of similarity. Based on classifying the new observation in the action cluster, the machine learning system may provide a recommendation, such as use Wilmont as a city for the address field. Additionally, or alternatively, the machine learning system may perform an automated action and/or may cause an automated action to be performed (e.g., by instructing another device to perform the automated action), such as replacing "Wilm." with "Wilmont" in the image data. As another example, if the machine learning system were to classify the new observation in another action cluster, then the machine learning system may provide a different recommendation (e.g., use Wilmington as a city for the address field) and/or may perform or cause performance of a different automated action (e.g., replacing "Wilm." with "Wilmington" in the image data).

In this way, the machine learning system may apply a rigorous and automated process to process image-based documents. The machine learning system enables recognition and/or identification of tens, hundreds, thousands, or millions of features and/or feature values for tens, hundreds, thousands, or millions of observations, thereby increasing an accuracy and consistency of processing image-based documents relative to requiring computing resources to be allocated for tens, hundreds, or thousands of operators to manually process image-based documents.

As indicated above, FIG. 3 is provided as an example. Other examples may differ from what is described in connection with FIG. 3.

Figure 4:
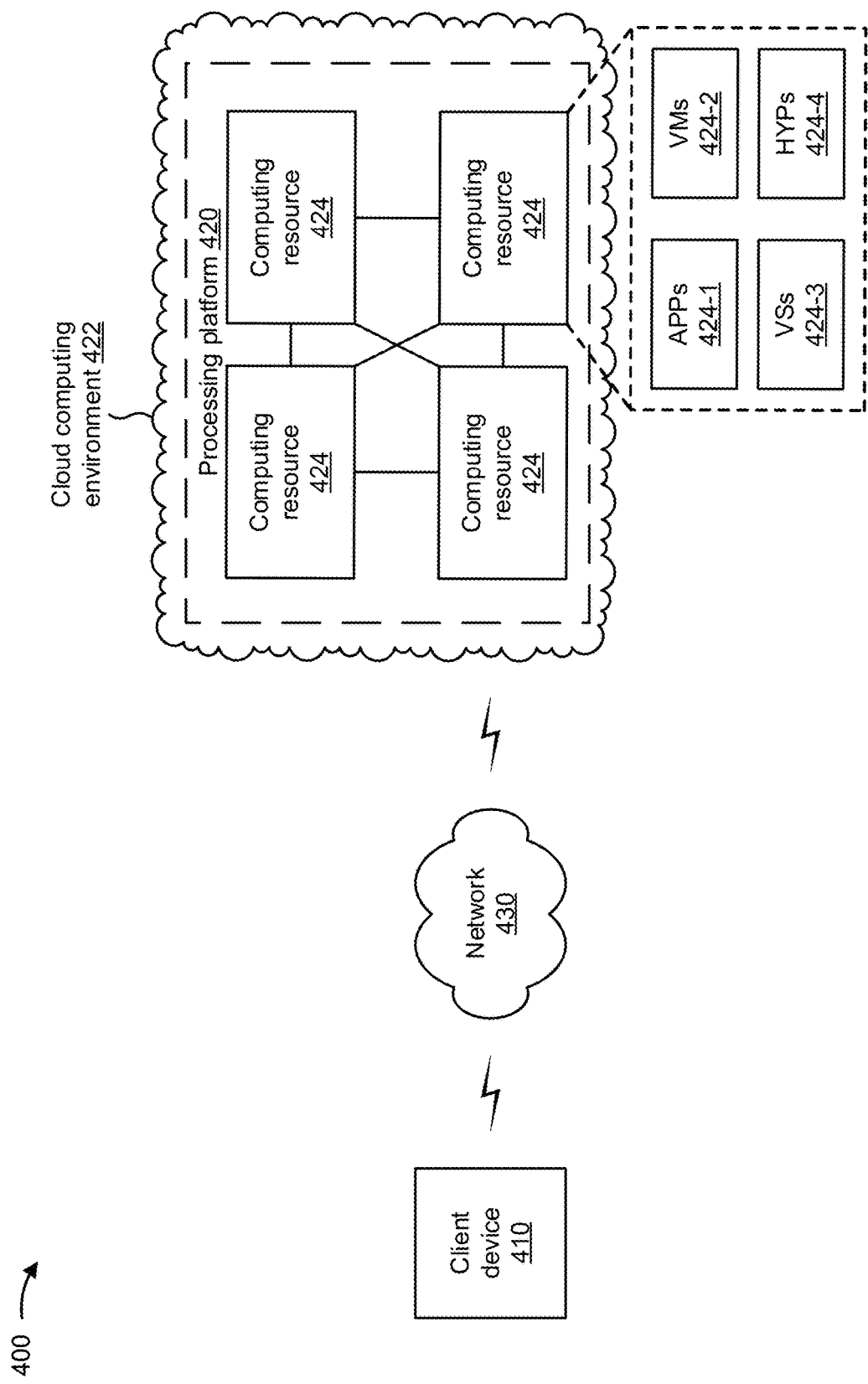
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include a client device 410, a processing platform 420, and a network 430. Devices of environment 400 may interconnect via wired connections, wireless connections, or a combination of wired and wireless connections.

Client device 410 includes one or more devices capable of receiving, generating, storing, processing, and/or providing information, such as information described herein. For example, client device 410 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, and/or the like), or a similar type of device. In some implementations, client device 410 may receive information from and/or transmit information to processing platform 420.

Processing platform 420 includes one or more devices that utilize machine learning models, position based extraction, and automated data labeling to process image-based documents. In some implementations, processing platform 420 may be designed to be modular such that certain software components may be swapped in or out depending on a particular need. As such, processing platform 420 may be easily and/or quickly reconfigured for different uses. In some implementations, processing platform 420 may receive information from and/or transmit information to one or more client devices 410.

In some implementations, as shown, processing platform 420 may be hosted in a cloud computing environment 422. Notably, while implementations described herein describe processing platform 420 as being hosted in cloud computing environment 422, in some implementations, processing platform 420 may not be cloud-based (i.e., may be implemented outside of a cloud computing environment) or may be partially cloud-based.

Cloud computing environment 422 includes an environment that hosts processing platform 420. Cloud computing environment 422 may provide computation, software, data access, storage, etc., services that do not require end-user knowledge of a physical location and configuration of system(s) and/or device(s) that hosts processing platform 420. As shown, cloud computing environment 422 may include a group of computing resources 424 (referred to collectively as "computing resources 424" and individually as "computing resource 424").

Computing resource 424 includes one or more personal computers, workstation computers, mainframe devices, or other types of computation and/or communication devices. In some implementations, computing resource 424 may host processing platform 420. The cloud resources may include compute instances executing in computing resource 424, storage devices provided in computing resource 424, data transfer devices provided by computing resource 424, etc. In some implementations, computing resource 424 may communicate with other computing resources 424 via wired connections, wireless connections, or a combination of wired and wireless connections.

As further shown in FIG. 2, computing resource 424 includes a group of cloud resources, such as one or more applications ("APPs") 424-1, one or more virtual machines ("VMs") 424-2, virtualized storage ("VSs") 424-3, one or more hypervisors ("HYPs") 424-4, and/or the like.

Application 424-1 includes one or more software applications that may be provided to or accessed by client device 410. Application 424-1 may eliminate a need to install and execute the software applications on client device 410. For example, application 424-1 may include software associated with processing platform 420 and/or any other software capable of being provided via cloud computing environment 422. In some implementations, one application 424-1 may send/receive information to/from one or more other applications 424-1, via virtual machine 424-2.

Virtual machine 424-2 includes a software implementation of a machine (e.g., a computer) that executes programs like a physical machine. Virtual machine 424-2 may be either a system virtual machine or a process virtual machine, depending upon use and degree of correspondence to any real machine by virtual machine 424-2. A system virtual machine may provide a complete system platform that supports execution of a complete operating system ("OS"). A process virtual machine may execute a single program and may support a single process. In some implementations, virtual machine 424-2 may execute on behalf of a user (e.g., a user of client device 410 or an operator of processing platform 420), and may manage infrastructure of cloud computing environment 422, such as data management, synchronization, or long-duration data transfers.

Virtualized storage 424-3 includes one or more storage systems and/or one or more devices that use virtualization techniques within the storage systems or devices of computing resource 424. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 424-4 may provide hardware virtualization techniques that allow multiple operating systems (e.g., "guest operating systems") to execute concurrently on a host computer, such as computing resource 424. Hypervisor 424-4 may present a virtual operating platform to the guest operating systems and may manage the execution of the guest operating systems. Multiple instances of a variety of operating systems may share virtualized hardware resources.

Network 430 includes one or more wired and/or wireless networks. For example, network 430 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
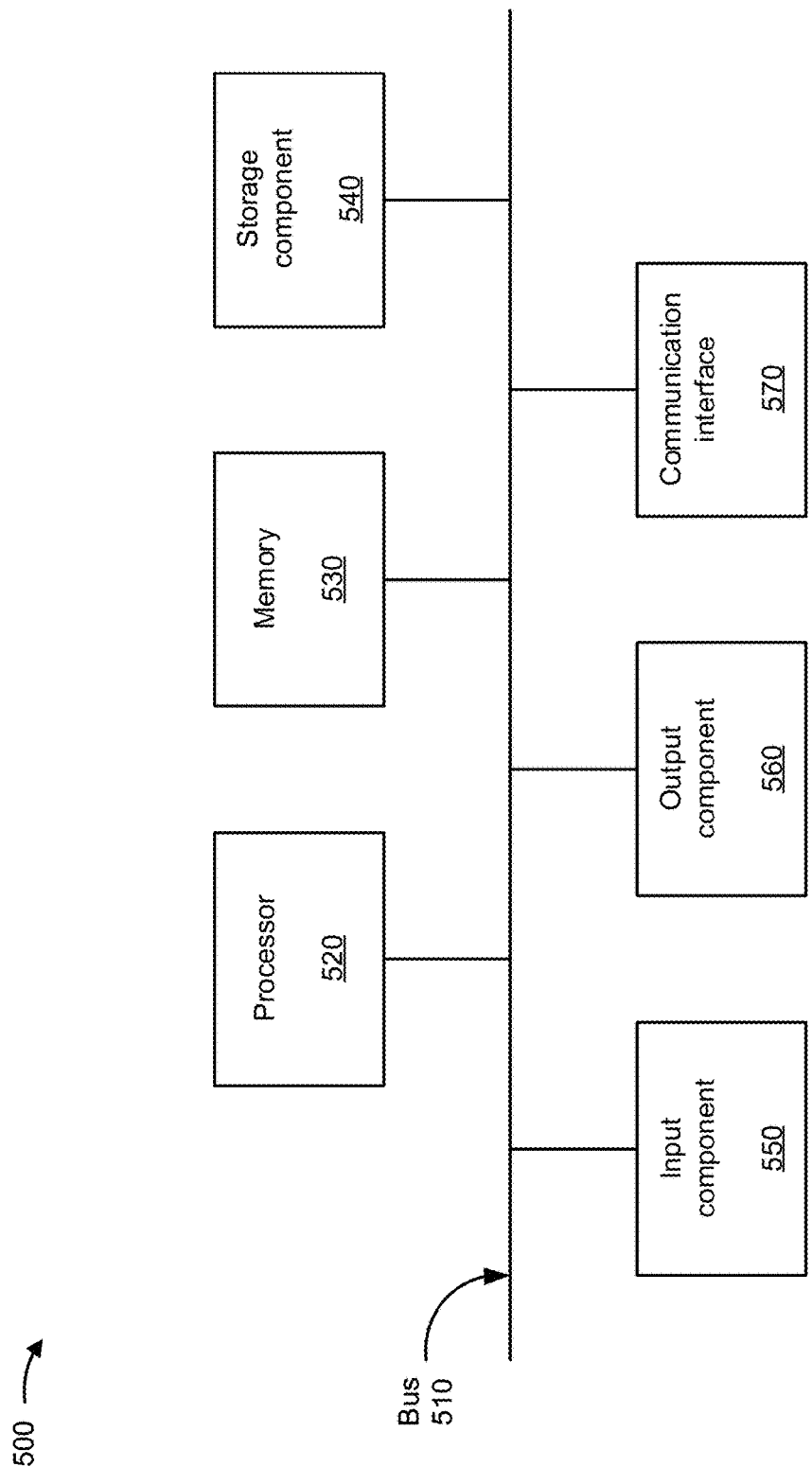
FIG. 5 is a diagram of example components of one or more devices of FIG. 4.

FIG. 5 is a diagram of example components of a device 500. Device 500 may correspond to client device 410, processing platform 420, and/or computing resource 424. In some implementations, client device 410, processing platform 420, and/or computing resource 424 may include one or more devices 500 and/or one or more components of device 500. As shown in FIG. 5, device 500 may include a bus 510, a processor 520, a memory 530, a storage component 540, an input component 550, an output component 560, and a communication interface 570.

Bus 510 includes a component that permits communication among the components of device 500. Processor 520 is implemented in hardware, firmware, or a combination of hardware and software. Processor 520 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 includes one or more processors capable of being programmed to perform a function. Memory 530 includes a random-access memory (RAM), a read only memory (ROM), and/or another type of dynamic or static storage device (e.g., a flash memory, a magnetic memory, and/or an optical memory) that stores information and/or instructions for use by processor 520.

Storage component 540 stores information and/or software related to the operation and use of device 500. For example, storage component 540 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 550 includes a component that permits device 500 to receive information, such as via user input (e.g., a touch screen display, a keyboard, a keypad, a mouse, a button, a switch, and/or a microphone). Additionally, or alternatively, input component 550 may include a sensor for sensing information (e.g., a global positioning system (GPS) component, an accelerometer, a gyroscope, and/or an actuator). Output component 560 includes a component that provides output information from device 500 (e.g., a display, a speaker, and/or one or more light-emitting diodes (LEDs)).

Communication interface 570 includes a transceiver-like component (e.g., a transceiver and/or a separate receiver and transmitter) that enables device 500 to communicate with other devices, such as via a wired connection, a wireless connection, or a combination of wired and wireless connections. Communication interface 570 may permit device 500 to receive information from another device and/or provide information to another device. For example, communication interface 570 may include an Ethernet interface, an optical interface, a coaxial interface, an infrared interface, a radio frequency (RF) interface, a universal serial bus (USB) interface, a Wi-Fi interface, a cellular network interface, and/or the like.

Device 500 may perform one or more processes described herein. Device 500 may perform these processes based on processor 520 executing software instructions stored by a non-transitory computer-readable medium, such as memory 530 and/or storage component 540. A computer-readable medium is defined herein as a non-transitory memory device. A memory device includes memory space within a single physical storage device or memory space spread across multiple physical storage devices.

Software instructions may be read into memory 530 and/or storage component 540 from another computer-readable medium or from another device via communication interface 570. When executed, software instructions stored in memory 530 and/or storage component 540 may cause processor 520 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
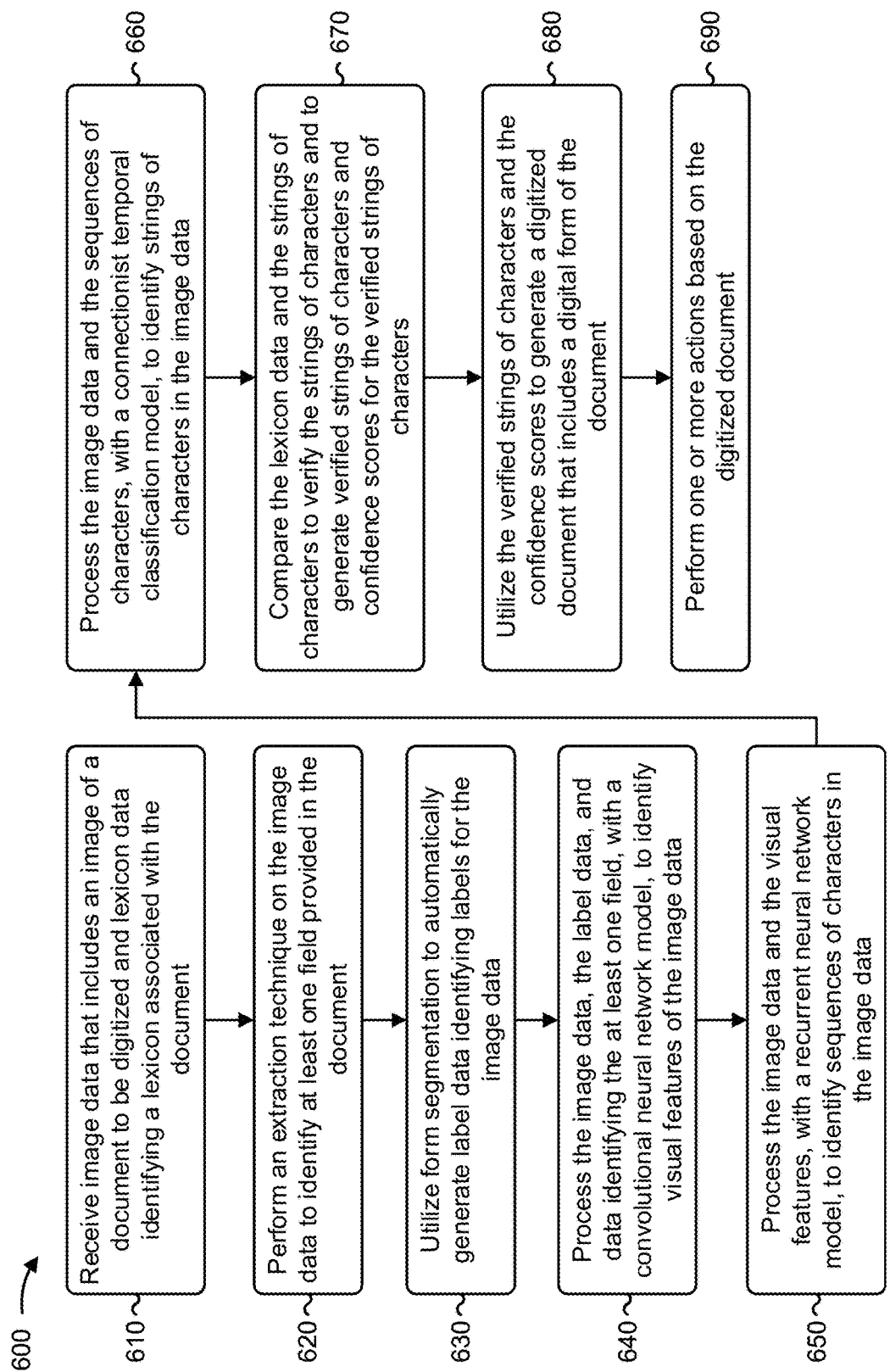
FIGS. 6-8 are flow charts of example processes for utilizing machine learning models, position based extraction, and automated data labeling to process image-based documents.

FIG. 6 is a flow chart of an example process 600 for utilizing machine learning models, position based extraction, and automated data labeling to process image-based documents. In some implementations, one or more process blocks of FIG. 6 may be performed by a device (e.g., processing platform 420). In some implementations, one or more process blocks of FIG. 6 may be performed by another device or a group of devices separate from or including the device, such as a client device (e.g., client device 410).

As shown in FIG. 6, process 600 may include receiving image data that includes an image of a document to be digitized and lexicon data identifying a lexicon associated with the document (block 610). For example, the device (e.g., using computing resource 424, processor 520, communication interface 570, and/or the like) may receive image data that includes an image of a document to be digitized and lexicon data identifying a lexicon associated with the document, as described above.

As further shown in FIG. 6, process 600 may include performing an extraction technique on the image data to identify at least one field provided in the document (block 620). For example, the device (e.g., using computing resource 424, processor 520, memory 530, and/or the like) may perform an extraction technique on the image data to identify at least one field provided in the document, as described above.

As further shown in FIG. 6, process 600 may include utilizing form segmentation to automatically generate label data identifying labels for the image data (block 630). For example, the device (e.g., using computing resource 424, processor 520, storage component 540, and/or the like) may utilize form segmentation to automatically generate label data identifying labels for the image data, as described above.

As further shown in FIG. 6, process 600 may include processing the image data, the label data, and data identifying the at least one field, with a convolutional neural network model, to identify visual features of the image data (block 640). For example, the device (e.g., using computing resource 424, processor 520, memory 530, and/or the like) may process the image data, the label data, and data identifying the at least one field, with a convolutional neural network model, to identify visual features of the image data, as described above.

As further shown in FIG. 6, process 600 may include processing the image data and the visual features, with a recurrent neural network model, to identify sequences of characters in the image data (block 650). For example, the device (e.g., using computing resource 424, processor 520, storage component 540, and/or the like) may process the image data and the visual features, with a recurrent neural network model, to identify sequences of characters in the image data, as described above.

As further shown in FIG. 6, process 600 may include processing the image data and the sequences of characters, with a connectionist temporal classification model, to identify strings of characters in the image data (block 660). For example, the device (e.g., using computing resource 424, processor 520, memory 530, and/or the like) may process the image data and the sequences of characters, with a connectionist temporal classification model, to identify strings of characters in the image data, as described above.

As further shown in FIG. 6, process 600 may include comparing the lexicon data and the strings of characters to verify the strings of characters and to generate verified strings of characters and confidence scores for the verified strings of characters (block 670). For example, the device (e.g., using computing resource 424, processor 520, storage component 540, communication interface 570, and/or the like) may compare the lexicon data and the strings of characters to verify the strings of characters and to generate verified strings of characters and confidence scores for the verified strings of characters, as described above.

As further shown in FIG. 6, process 600 may include utilizing the verified strings of characters and the confidence scores to generate a digitized document that includes a digital form of the document (block 680). For example, the device (e.g., using computing resource 424, processor 520, memory 530, and/or the like) may utilize the verified strings of characters and the confidence scores to generate a digitized document that includes a digital form of the document, as described above.

As further shown in FIG. 6, process 600 may include performing one or more actions based on the digitized document (block 690). For example, the device (e.g., using computing resource 424, processor 520, memory 530, storage component 540, communication interface 570, and/or the like) may perform one or more actions based on the digitized document, as described above.

Process 600 may include additional implementations, such as any single implementation or any combination of implementations described below and/or in connection with one or more other processes described elsewhere herein.

In a first implementation, performing the extraction technique on the image data to identify the at least one field provided in the document may include performing position based extraction, using a triangulation method, on the image data to identify the at least one field provided in the document; or performing entity based extraction on the image data to identify the least one field provided in the document.

In a second implementation, alone or in combination with the first implementation, performing the position based extraction, using the triangulation method, on the image data to identify the at least one field provided in the document may include identifying particular text in the image of the document; designating the particular text as anchors for the image of the document; and triangulating the anchors to the image data to identify the at least one field provided in the document.

In a third implementation, alone or in combination with one or more of the first and second implementations, utilizing the form segmentation to automatically generate the label data identifying the labels for the image data may include utilizing the form segmentation and crowdsourcing to automatically generate the label data identifying the labels for the image data.

In a fourth implementation, alone or in combination with one or more of the first through third implementations, performing the one or more actions based on the digitized document may include providing the digitized document to a client device; storing the digitized document in a data structure; or receiving feedback on the digitized document that includes confidence scores for the verified strings of characters.

In a fifth implementation, alone or in combination with one or more of the first through fourth implementations, performing the one or more actions based on the digitized document may include identifying a related digitized document that is related to the digitized document and grouping the related digitized document and the digitized document together; generating a summary for the digitized document and providing the summary for display; or retraining the convolutional neural network model, the recurrent neural network model, or the connectionist temporal classification model based on the digitized document.

In a sixth implementation, alone or in combination with one or more of the first through fifth implementations, the convolutional neural network model may include successive two-dimensional convolutions with a rectified linear unit nonlinearity, and application of batch normalization and dropout following each of the two-dimensional convolutions.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
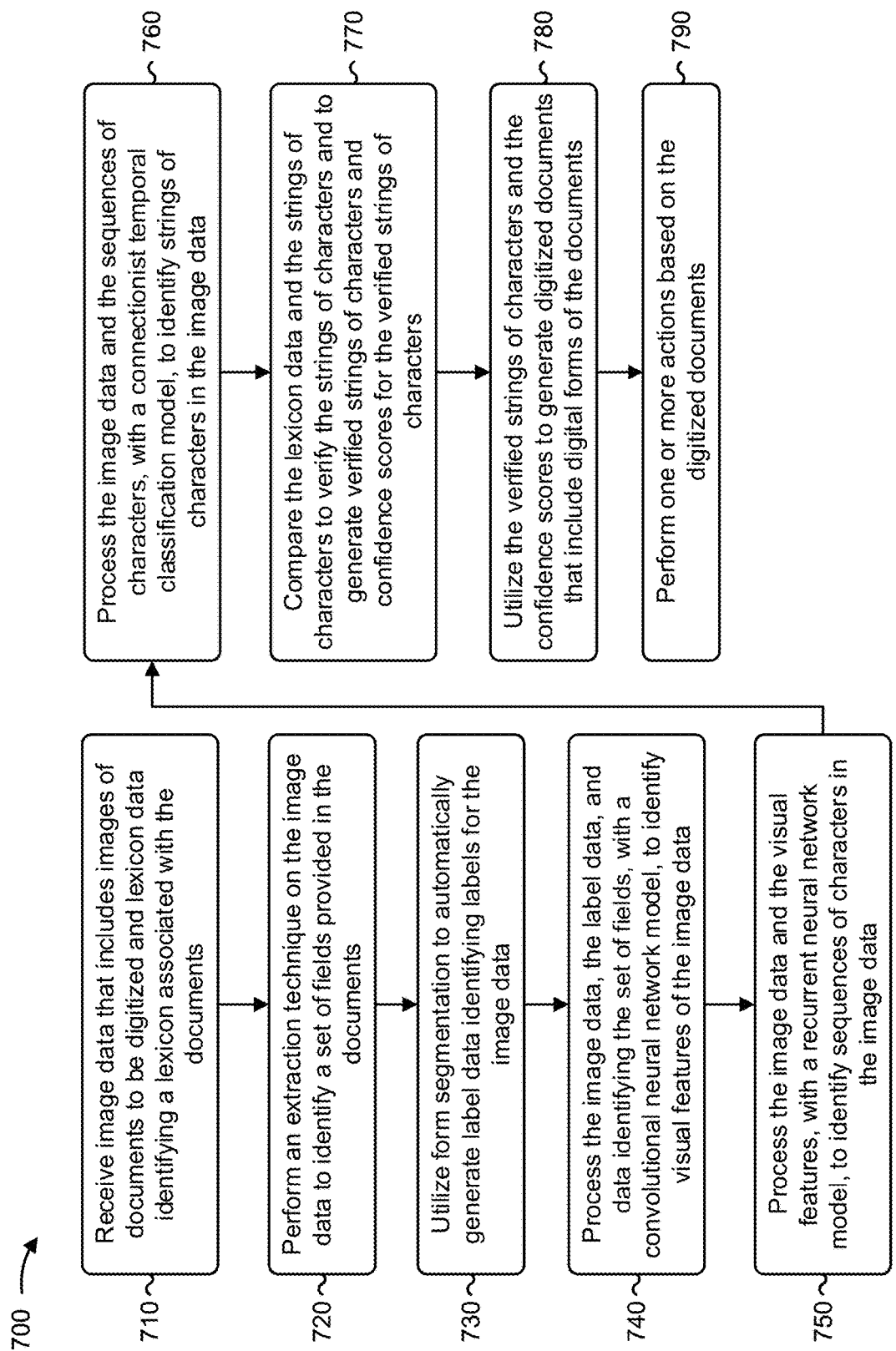

FIG. 7 is a flow chart of an example process 700 for utilizing machine learning models, position based extraction, and automated data labeling to process image-based documents. In some implementations, one or more process blocks of FIG. 7 may be performed by a device (e.g., processing platform 420). In some implementations, one or more process blocks of FIG. 7 may be performed by another device or a group of devices separate from or including the device, such as a client device (e.g., client device 410).

As shown in FIG. 7, process 700 may include receiving image data that includes images of documents to be digitized and lexicon data identifying a lexicon associated with the documents (block 710). For example, the device (e.g., using computing resource 424, processor 520, communication interface 570, and/or the like) may receive image data that includes images of documents to be digitized and lexicon data identifying a lexicon associated with the documents, as described above.

As further shown in FIG. 7, process 700 may include performing an extraction technique on the image data to identify a set of fields provided in the documents (block 720). For example, the device (e.g., using computing resource 424, processor 520, memory 530, and/or the like) may perform an extraction technique on the image data to identify a set of fields provided in the documents, as described above.

As further shown in FIG. 7, process 700 may include utilizing form segmentation to automatically generate label data identifying labels for the image data (block 730). For example, the device (e.g., using computing resource 424, processor 520, storage component 540, and/or the like) may utilize form segmentation to automatically generate label data identifying labels for the image data, as described above.

As further shown in FIG. 7, process 700 may include processing the image data, the label data, and data identifying the set of fields, with a convolutional neural network model, to identify visual features of the image data (block 740). For example, the device (e.g., using computing resource 424, processor 520, memory 530, and/or the like) may process the image data, the label data, and data identifying the set of fields, with a convolutional neural network model, to identify visual features of the image data, as described above.

As further shown in FIG. 7, process 700 may include processing the image data and the visual features, with a recurrent neural network model, to identify sequences of characters in the image data (block 750). For example, the device (e.g., using computing resource 424, processor 520, storage component 540, and/or the like) may process the image data and the visual features, with a recurrent neural network model, to identify sequences of characters in the image data, as described above.

As further shown in FIG. 7, process 700 may include processing the image data and the sequences of characters, with a connectionist temporal classification model, to identify strings of characters in the image data (block 760). For example, the device (e.g., using computing resource 424, processor 520, memory 530, and/or the like) may process the image data and the sequences of characters, with a connectionist temporal classification model, to identify strings of characters in the image data, as described above.

As further shown in FIG. 7, process 700 may include comparing the lexicon data and the strings of characters to verify the strings of characters and to generate verified strings of characters and confidence scores for the verified strings of characters (block 770). For example, the device (e.g., using computing resource 424, processor 520, storage component 540, and/or the like) may compare the lexicon data and the strings of characters to verify the strings of characters and to generate verified strings of characters and confidence scores for the verified strings of characters, as described above.

As further shown in FIG. 7, process 700 may include utilizing the verified strings of characters and the confidence scores to generate digitized documents that include digital forms of the documents (block 780). For example, the device (e.g., using computing resource 424, processor 520, memory 530, and/or the like) may utilize the verified strings of characters and the confidence scores to generate digitized documents that include digital forms of the documents, as described above.

As further shown in FIG. 7, process 700 may include performing one or more actions based on the digitized documents (block 790). For example, the device (e.g., using computing resource 424, processor 520, memory 530, storage component 540, communication interface 570, and/or the like) may perform one or more actions based on the digitized documents, as described above.

Process 700 may include additional implementations, such as any single implementation or any combination of implementations described below and/or in connection with one or more other processes described elsewhere herein.

In a first implementation, the recurrent neural network model may include stacked multiple recurrent layers, skip-connections between an input and an output of each recurrent layer, and bidirectional recurrent neural networks.

In a second implementation, alone or in combination with the first implementation, the connectionist temporal classification model may include a softmax model and a forward-backward model.

In a third implementation, alone or in combination with one or more of the first and second implementations, process 700 may include training one or more of the convolutional neural network model, the recurrent neural network model, or the connectionist temporal classification model with a data is setting that includes handwritten words, handwritten digits, and alphanumeric characters, a data is setting that includes individual characters, or a data is setting that includes extracted data that is labeled via crowdsourcing.

In a fourth implementation, alone or in combination with one or more of the first through third implementations, process 700 may include receiving feedback associated with one of the digitized documents; retraining the convolutional neural network model, the recurrent neural network model, and the connectionist temporal classification model based on the feedback; processing the one of the digitized documents with the convolutional neural network model, the recurrent neural network model, and the connectionist temporal classification model, after retraining, to generate a modified digitized document; and providing the modified digitized document for display.

In a fifth implementation, alone or in combination with one or more of the first through fourth implementations, process 700 may include identifying a topic associated with the documents; identifying a portion of the lexicon data that is associated with the topic; and comparing the portion of the lexicon data and the strings of characters to verify the strings of characters and to generate the verified strings of characters and the confidence scores for the verified strings of characters.

In a sixth implementation, alone or in combination with one or more of the first through fifth implementations, the visual features may be arranged in a grid that forms a sequential representation of the image of the document.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Figure 8:
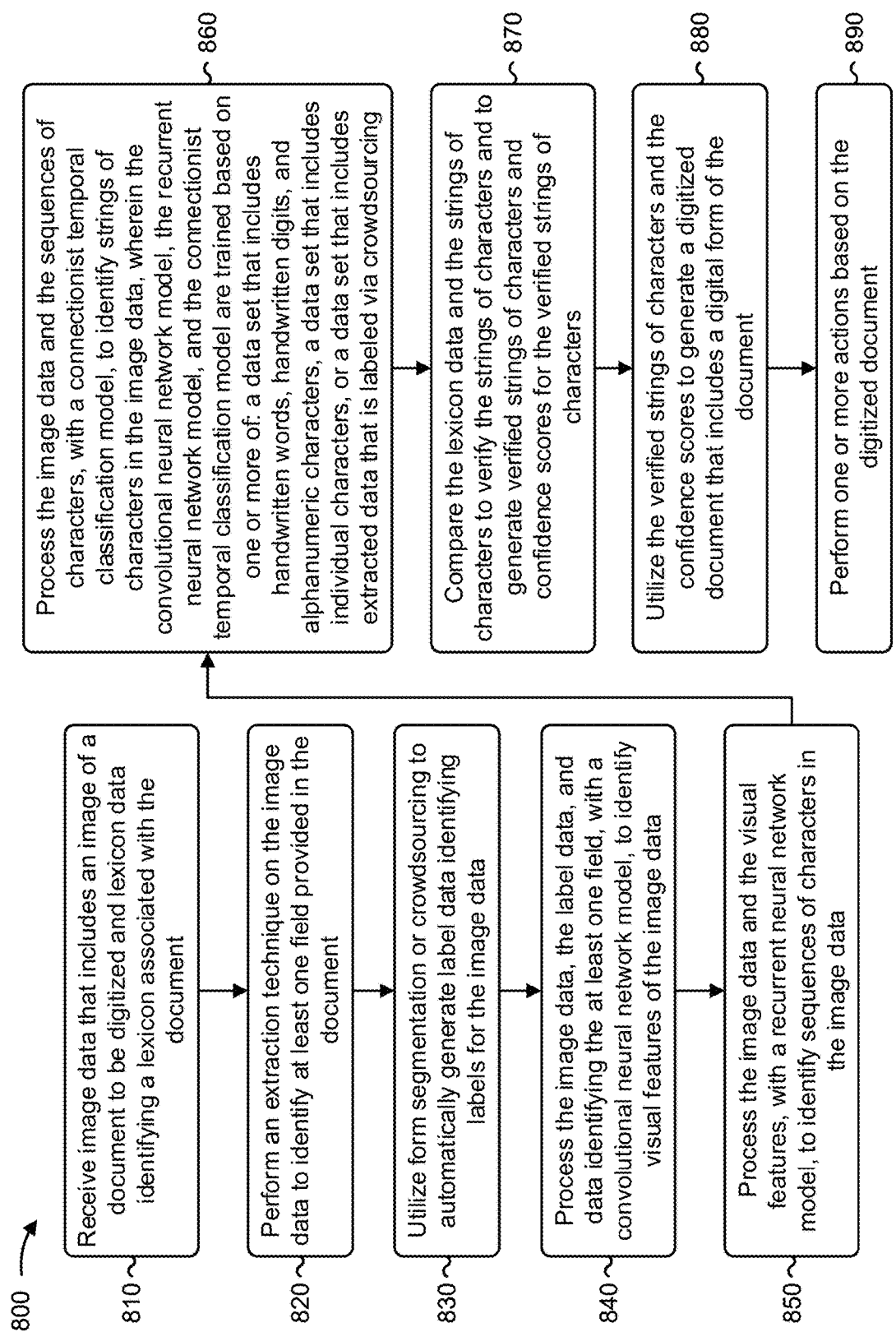

FIG. 8 is a flow chart of an example process 800 for utilizing machine learning models, position based extraction, and automated data labeling to process image-based documents. In some implementations, one or more process blocks of FIG. 8 may be performed by a device (e.g., processing platform 420). In some implementations, one or more process blocks of FIG. 8 may be performed by another device or a group of devices separate from or including the device, such as a client device (e.g., client device 410).

As shown in FIG. 8, process 800 may include receiving image data that includes an image of a document to be digitized and lexicon data identifying a lexicon associated with the document (block 810). For example, the device (e.g., using computing resource 424, processor 520, communication interface 570, and/or the like) may receive image data that includes an image of a document to be digitized and lexicon data identifying a lexicon associated with the document, as described above.

As further shown in FIG. 8, process 800 may include performing an extraction technique on the image data to identify at least one field provided in the document (block 820). For example, the device (e.g., using computing resource 424, processor 520, memory 530, and/or the like) may perform an extraction technique on the image data to identify at least one field provided in the document, as described above.

As further shown in FIG. 8, process 800 may include utilizing form segmentation or crowdsourcing to automatically generate label data identifying labels for the image data (block 830). For example, the device (e.g., using computing resource 424, processor 520, storage component 540, and/or the like) may utilize form segmentation or crowdsourcing to automatically generate label data identifying labels for the image data, as described above.

As further shown in FIG. 8, process 800 may include processing the image data, the label data, and data identifying the at least one field, with a convolutional neural network model, to identify visual features of the image data (block 840). For example, the device (e.g., using computing resource 424, processor 520, memory 530, and/or the like) may process the image data, the label data, and data identifying the at least one field, with a convolutional neural network model, to identify visual features of the image data, as described above.

As further shown in FIG. 8, process 800 may include processing the image data and the visual features, with a recurrent neural network model, to identify sequences of characters in the image data (block 850). For example, the device (e.g., using computing resource 424, processor 520, storage component 540, and/or the like) may process the image data and the visual features, with a recurrent neural network model, to identify sequences of characters in the image data, as described above.

As further shown in FIG. 8, process 800 may include processing the image data and the sequences of characters, with a connectionist temporal classification model, to identify strings of characters in the image data, wherein the convolutional neural network model, the recurrent neural network model, and the connectionist temporal classification model are trained based on one or more of a data set that includes handwritten words, handwritten digits, and alphanumeric characters, a data set that includes individual characters, or a data set that includes extracted data that is labeled via crowdsourcing (block 860). For example, the device (e.g., using computing resource 424, processor 520, memory 530, and/or the like) may process the image data and the sequences of characters, with a connectionist temporal classification model, to identify strings of characters in the image data, as described above. In some implementations, the convolutional neural network model, the recurrent neural network model, and the connectionist temporal classification model are trained based on a data set that includes handwritten words, handwritten digits, and alphanumeric characters, a data set that includes individual characters, or a data set that includes extracted data that is labeled via crowdsourcing.

As further shown in FIG. 8, process 800 may include comparing the lexicon data and the strings of characters to verify the strings of characters and to generate verified strings of characters and confidence scores for the verified strings of characters (block 870). For example, the device (e.g., using computing resource 424, processor 520, storage component 540, and/or the like) may compare the lexicon data and the strings of characters to verify the strings of characters and to generate verified strings of characters and confidence scores for the verified strings of characters, as described above.

As further shown in FIG. 8, process 800 may include utilizing the verified strings of characters and the confidence scores to generate a digitized document that includes a digital form of the document (block 880). For example, the device (e.g., using computing resource 424, processor 520, memory 530, and/or the like) may utilize the verified strings of characters and the confidence scores to generate a digitized document that includes a digital form of the document, as described above.

As further shown in FIG. 8, process 800 may include performing one or more actions based on the digitized document (block 890). For example, the device (e.g., using computing resource 424, processor 520, memory 530, storage component 540, communication interface 570, and/or the like) may perform one or more actions based on the digitized document, as described above.

Process 800 may include additional implementations, such as any single implementation or any combination of implementations described below and/or in connection with one or more other processes described elsewhere herein.

In a first implementation, performing the extraction technique on the image data to identify the at least one field provided in the document may include performing position based extraction, using a triangulation method, on the image data to identify the at least one field provided in the document; or performing entity based extraction on the image data to identify the least one field provided in the document.

In a second implementation, alone or in combination with the first implementation, performing the one or more actions based on the digitized document may include providing the digitized document to a client device; storing the digitized document in a data structure; receiving feedback on the digitized document that includes confidence scores for the verified strings of characters; identifying a related digitized document that is related to the digitized document, and grouping the related digitized document and the digitized document together; generating a summary for the digitized document and providing the summary for display; or retraining the convolutional neural network model, the recurrent neural network model, or the connectionist temporal classification model based on the digitized document.

In a third implementation, alone or in combination with one or more of the first and second implementations, the convolutional neural network model may include successive two-dimensional convolutions with a rectified linear unit nonlinearity, and application of batch normalization and dropout following each of the two-dimensional convolutions; the recurrent neural network model may include stacked multiple recurrent layers, skip-connections between an input and an output of each recurrent layer, and bidirectional recurrent neural networks; and the connectionist temporal classification model may include a softmax model and a forward-backward model.

In a fourth implementation, alone or in combination with one or more of the first through third implementations, process 800 may include receiving feedback associated with the digitized document; retraining the convolutional neural network model, the recurrent neural network model, and the connectionist temporal classification model based on the feedback; processing the digitized document with the convolutional neural network model, the recurrent neural network model, the connectionist temporal classification model, after retraining, to generate a modified digitized document; and providing the modified digitized document for display.

In a fifth implementation, alone or in combination with one or more of the first through fourth implementations, process 800 may include identifying a topic associated with the document; identifying a portion of the lexicon data that is associated with the topic; and comparing the portion of the lexicon data and the strings of characters to verify the strings of characters and to generate the verified strings of characters and the confidence scores for the verified strings of characters.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    receiving, by a device, image data that includes an image of a document to be digitized and lexicon data identifying a lexicon associated with the document;
    performing, by the device, an extraction technique on the image data to identify at least one field provided in the document;
    utilizing, by the device, form segmentation to automatically generate label data identifying labels for the image data,
        wherein the labels are associated with labeling data, including the at least one field, associated with the image data;
    processing, by the device, the image data, the label data, and data identifying the at least one field, with a convolutional neural network model, to identify visual features of the image data;
    processing, by the device, the image data and the visual features, with a recurrent neural network model, to identify sequences of characters in the image data;
    processing, by the device, the image data and the sequences of characters, with a connectionist temporal classification model, to identify strings of characters in the image data;
    comparing, by the device, the lexicon data and the strings of characters to verify the strings of characters and to generate verified strings of characters and confidence scores for the verified strings of characters;
    utilizing, by the device, the verified strings of characters and the confidence scores to generate a digitized document that includes a digital form of the document;
    obtaining, by the device, feedback on the digitized documents that assesses an accuracy of the confidence scores; and
    performing one or more actions based on the digitized document.

2. The method of claim 1, wherein performing the extraction technique on the image data to identify the at least one field provided in the document comprises one or more of:
    performing position based extraction, using a triangulation method, on the image data to identify the at least one field provided in the document; or
    performing entity based extraction on the image data to identify the least one field provided in the document.

3. The method of claim 2, wherein performing the position based extraction, using the triangulation method, on the image data to identify the at least one field provided in the document comprises:
    identifying particular text in the image of the document;
    designating the particular text as anchors for the image of the document; and
    triangulating the anchors to the image data to identify the at least one field provided in the document.

4. The method of claim 1, wherein utilizing the form segmentation to automatically generate the label data identifying the labels for the image data comprises:
    utilizing the form segmentation and crowdsourcing to automatically generate the label data identifying the labels for the image data.

5. The method of claim 1, wherein performing the one or more actions based on the digitized document comprises one or more of:
providing the digitized document to a client device; or
storing the digitized document in a data structure.

6. The method of claim 1, wherein performing the one or more actions based on the digitized document comprises one or more of:
identifying a related digitized document that is related to the digitized document and grouping the related digitized document and the digitized document together;
generating a summary for the digitized document and providing the summary for display; or
retraining the convolutional neural network model, the recurrent neural network model, or the connectionist temporal classification model based on the digitized document.

7. The method of claim 1, wherein the convolutional neural network model includes successive two-dimensional convolutions with a rectified linear unit nonlinearity, and application of batch normalization and dropout following each of the two-dimensional convolutions.

8. A device, comprising:
one or more memories; and
one or more processors, communicatively coupled to the one or more memories, configured to:
receive image data that includes images of documents to be digitized and lexicon data identifying a lexicon associated with the documents;
perform an extraction technique on the image data to identify a set of fields provided in the documents;
utilize form segmentation to automatically generate label data identifying labels for the image data,
wherein the labels are associated with labeling data, including at least one field, of the set of fields, associated with the image data;
process the image data, the label data, and data identifying the set of fields, with a convolutional neural network model, to identify visual features of the image data;
process the image data and the visual features, with a recurrent neural network model, to identify sequences of characters in the image data;
process the image data and the sequences of characters, with a connectionist temporal classification model, to identify strings of characters in the image data;
compare the lexicon data and the strings of characters to verify the strings of characters and to generate verified strings of characters and confidence scores for the verified strings of characters;
utilize the verified strings of characters and the confidence scores to generate digitized documents that include digital forms of the documents;
obtain feedback on the digitized documents that assesses an accuracy of the confidence scores; and
perform one or more actions based on the digitized documents.

9. The device of claim 8, wherein the recurrent neural network model includes:
stacked multiple recurrent layers,
skip-connections between an input and an output of each recurrent layer, and
bidirectional recurrent neural networks.

10. The device of claim 8, wherein the connectionist temporal classification model includes:
a softmax model, and
a forward-backward model.

11. The device of claim 8, wherein the one or more processors are further configured to:
train one or more of the convolutional neural network model, the recurrent neural network model, or the connectionist temporal classification model with one or more of:
a data set that includes handwritten words, handwritten digits, and alphanumeric characters,
a data set that includes individual characters, or
a data set that includes extracted data that is labeled via crowdsourcing.

12. The device of claim 8, wherein the one or more processors, when performing the one or more actions, are configured to:
retrain the convolutional neural network model, the recurrent neural network model, and the connectionist temporal classification model based on the feedback;
process the one of the digitized documents with the convolutional neural network model, the recurrent neural network model, and the connectionist temporal classification model, after retraining, to generate a modified digitized document; and
provide the modified digitized document for display.

13. The device of claim 8, wherein the one or more processors, when comparing the lexicon data and the strings of characters to verify the strings of characters and to generate the verified strings of characters and the confidence scores, are configured to:
identify a topic associated with the documents;
identify a portion of the lexicon data that is associated with the topic; and
compare the portion of the lexicon data and the strings of characters to verify the strings of characters and to generate the verified strings of characters and the confidence scores for the verified strings of characters.

14. The device of claim 8, wherein the visual features are arranged in a grid that forms a sequential representation of the images of the document.

15. A non-transitory computer-readable medium storing instructions, the instructions comprising:
one or more instructions that, when executed by one or more processors of a device, cause the one or more processors to:
receive image data that includes an image of a document to be digitized and lexicon data identifying a lexicon associated with the document;
perform an extraction technique on the image data to identify at least one field provided in the document;
utilize form segmentation or crowdsourcing to automatically generate label data identifying labels for the image data,
wherein the labels are associated with labeling data, including the at least one field, associated with the image data;
process the image data, the label data, and data identifying the at least one field, with a convolutional neural network model, to identify visual features of the image data;
process the image data and the visual features, with a recurrent neural network model, to identify sequences of characters in the image data;
process the image data and the sequences of characters, with a connectionist temporal classification model, to identify strings of characters in the image data,
wherein the convolutional neural network model, the recurrent neural network model, and the connectionist temporal classification model are trained based on one or more of:
  a data set that includes handwritten words, handwritten digits, and alphanumeric characters,
  a data set that includes individual characters, or
  a data set that includes extracted data that is labeled via crowdsourcing;
compare the lexicon data and the strings of characters to verify the strings of characters and to generate verified strings of characters and confidence scores for the verified strings of characters;
utilize the verified strings of characters and the confidence scores to generate a digitized document that includes a digital form of the document;
obtain feedback on the digitized document that assesses an accuracy of the confidence scores; and
perform one or more actions based on the digitized document.

16. The non-transitory computer-readable medium of claim 15, wherein the one or more instructions, that cause the one or more processors to perform the extraction technique on the image data to identify the at least one field provided in the document, cause the one or more processors to one or more of:
  perform position based extraction, using a triangulation method, on the image data to identify the at least one field provided in the document; or
  perform entity based extraction on the image data to identify the least one field provided in the document.

17. The non-transitory computer-readable medium of claim 15, wherein the one or more instructions, that cause the one or more processors to perform the one or more actions based on the digitized document, cause the one or more processors to one or more of:
  provide the digitized document to a client device;
  store the digitized document in a data structure;
  identify a related digitized document that is related to the digitized document, and group the related digitized document and the digitized document together;
  generate a summary for the digitized document and provide the summary for display; or
  retrain the convolutional neural network model, the recurrent neural network model, or the connectionist temporal classification model based on the digitized document.

18. The non-transitory computer-readable medium of claim 15, wherein:
  the convolutional neural network model includes successive two-dimensional convolutions with a rectified linear unit nonlinearity, and application of batch normalization and dropout following each of the two-dimensional convolutions;
  the recurrent neural network model includes stacked multiple recurrent layers, skip-connections between an input and an output of each recurrent layer, and bidirectional recurrent neural networks; and
  the connectionist temporal classification model includes a softmax model and a forward-backward model.

19. The non-transitory computer-readable medium of claim 15, wherein the one or more instructions, that cause the one or more processors to perform the one or more actions, cause the one or more processors to:
  retrain the convolutional neural network model, the recurrent neural network model, and the connectionist temporal classification model based on the feedback;
  process the digitized document with the convolutional neural network model, the recurrent neural network model, the connectionist temporal classification model, after retraining, to generate a modified digitized document; and
  provide the modified digitized document for display.

20. The non-transitory computer-readable medium of claim 15, wherein the one or more instructions, that cause the one or more processors to compare the lexicon data and the strings of characters to verify the strings of characters and to generate the verified strings of characters and the confidence scores, cause the one or more processors to:
  identify a topic associated with the document;
  identify a portion of the lexicon data that is associated with the topic; and
  compare the portion of the lexicon data and the strings of characters to verify the strings of characters and to generate the verified strings of characters and the confidence scores for the verified strings of characters.

* * * * *